United States Patent
Lee et al.

(10) Patent No.: US 9,986,454 B2
(45) Date of Patent: May 29, 2018

(54) METHOD FOR SETTING INTERFERENCE MEASUREMENT RESOURCE IN WIRELESS COMMUNICATION SYSTEM AND APPARATUS THEREFOR

(71) Applicant: LG ELECTRONICS INC., Seoul (KR)

(72) Inventors: Seungmin Lee, Seoul (KR); Hanbyul Seo, Seoul (KR); Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 9 days.

(21) Appl. No.: 15/027,947

(22) PCT Filed: Oct. 21, 2014

(86) PCT No.: PCT/KR2014/009883
§ 371 (c)(1),
(2) Date: Apr. 7, 2016

(87) PCT Pub. No.: WO2015/060619
PCT Pub. Date: Apr. 30, 2015

(65) Prior Publication Data
US 2016/0242054 A1 Aug. 18, 2016

Related U.S. Application Data

(60) Provisional application No. 61/893,869, filed on Oct. 21, 2013.

(51) Int. Cl.
*H04W 72/04* (2009.01)
*H04L 5/00* (2006.01)
(Continued)

(52) U.S. Cl.
CPC .......... *H04W 24/08* (2013.01); *H04B 17/345* (2015.01); *H04L 5/0048* (2013.01); *H04W 72/042* (2013.01); *H04W 72/082* (2013.01)

(58) Field of Classification Search
CPC ... H04B 17/336; H04B 17/345; H04L 5/0048; H04W 24/08; H04W 72/042; H04W 72/0446; H04W 72/044
See application file for complete search history.

(56) References Cited

U.S. PATENT DOCUMENTS

2012/0315859 A1 12/2012 Lee et al.
2013/0242902 A1 9/2013 Liu et al.
(Continued)

FOREIGN PATENT DOCUMENTS

| KR | 10-2011-0097623 A | 8/2011 |
|----|-------------------|--------|
| WO | WO 2011/115421 A2 | 9/2011 |
| WO | WO 2013/066085 A1 | 5/2013 |

OTHER PUBLICATIONS

Qualcomm Incorporated, "CSI Measurement for eIMTA," 3GPP TSG RAN WG1 Meeting #74, R1-133580, Barcelona, Spain, Aug. 19-23, 2013, pp. 1-4.

*Primary Examiner* — Andrew W Chriss
*Assistant Examiner* — Lalita W Pace
(74) *Attorney, Agent, or Firm* — Birch, Stewart, Kolasch & Birch, LLP

(57) ABSTRACT

The present invention relates to a method and an apparatus for a terminal to perform interference measurement in a wireless communication system. More specifically, the method comprises the steps of: receiving a first interference measurement resource setting and a second interference measurement resource setting for one channel state estimation process (Channel State Information Process); and performing interference measurement on an interference measurement resource based on the first interference measurement resource setting and the second interference measurement resource setting, wherein the first interference measurement resource setting is set for an aggregation of first downlink subframes, in which the use of a wireless (Continued)

resource is set not to be changed by a repurposing message, and the second interference measurement resource setting is set for an aggregation of second downlink subframes, in which the use of the wireless resource is set not to be changed by the repurposing message.

10 Claims, 18 Drawing Sheets

(51) Int. Cl.
*H04W 24/08* (2009.01)
*H04B 17/345* (2015.01)
*H04W 72/08* (2009.01)

(56) References Cited

U.S. PATENT DOCUMENTS

| | | | |
|---|---|---|---|
| 2014/0198680 A1* | 7/2014 | Siomina | H04L 5/14 370/252 |
| 2014/0200016 A1* | 7/2014 | Siomina | H04W 24/08 455/450 |
| 2014/0341089 A1* | 11/2014 | Ji | H04L 5/0073 370/278 |
| 2015/0029964 A1 | 1/2015 | Seo et al. | |
| 2016/0105248 A1* | 4/2016 | Lunttila | H04B 17/345 370/252 |
| 2016/0197687 A1* | 7/2016 | Song | H04L 5/00 370/252 |
| 2016/0352455 A1* | 12/2016 | Li | H04B 1/50 |

\* cited by examiner

FIG. 2
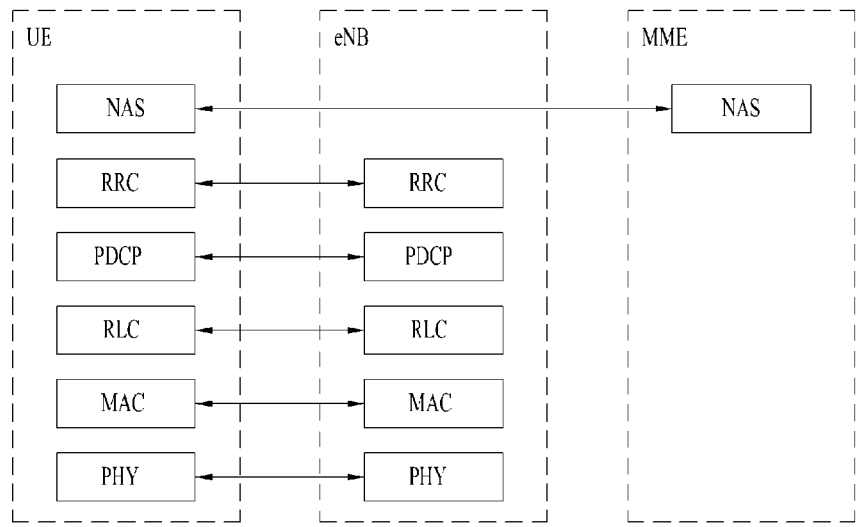
(a) control-plane protocol stack
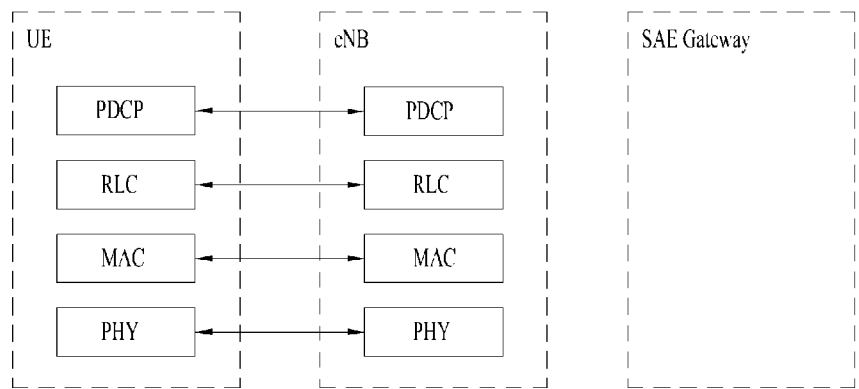
(b) user-plane protocol stack (a) Fixed value for CSI feedback (b) Re - using of previous RI (c) Re - indexing of UL subframe FIG. 18
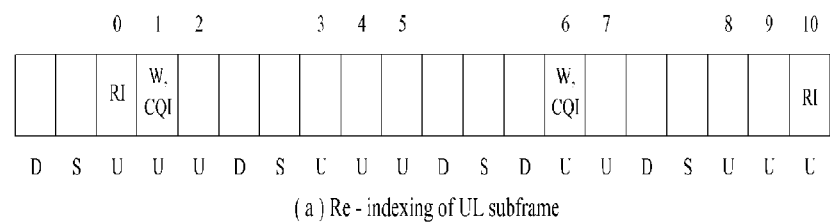
(a) Re - indexing of UL subframe
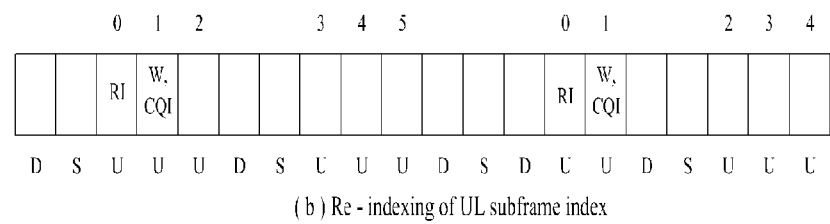
(b) Re - indexing of UL subframe index

METHOD FOR SETTING INTERFERENCE MEASUREMENT RESOURCE IN WIRELESS COMMUNICATION SYSTEM AND APPARATUS THEREFOR

CROSS REFERENCE TO RELATED APPLICATIONS

This application is the National Phase of PCT International Application No. PCT/KR2014/009883, filed on Oct. 21, 2014, which claims priority under 35 U.S.C. 119(e) to U.S. Provisional Application No. 61/893,869, filed on Oct. 21, 2013, all of which are hereby expressly incorporated by reference into the present application.

TECHNICAL FIELD

The present invention relates to a wireless communication system, and more particularly, to a method of setting an interference measurement resource in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

An object of the present invention is to provide a method of setting an interference measurement resource in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of measuring interference, which is measured by a user equipment in a wireless communication system, includes the steps of receiving a first interference measurement resource configuration and a second interference measurement resource configuration for one channel state estimation process (channel state information process) and measuring interference from an interference measurement resource based on the first interference measurement resource configuration and the second interference measurement resource configuration. In this case, the first interference measurement resource configuration is configured for a first downlink subframe set which is configured not to change a usage of a radio resource by a usage change message and the second interference measurement resource configuration is configured for a second downlink subframe set which is configured to change a usage of a radio resource by a usage change message.

Preferably, an interference characteristic of the first downlink subframe set and an interference characteristic of the second downlink subframe set may be different from each other.

Preferably, if the interference measurement resource is positioned at the first downlink subframe set and is interlocked with the first interference measurement resource configuration, whether or not the interference measurement resource is valid can be configured to be determined based on a zero-power channel state information-reference signal resource configuration (zero-power CSI-RS resource configuration).

Preferably, if the interference measurement resource is positioned at the first downlink subframe set and is interlocked with the second interference measurement resource configuration, whether or not the interference measurement resource is valid can be configured to be determined irrespective of a zero-power channel state information-reference signal resource configuration (zero-power CSI-RS resource configuration).

Preferably, if the interference measurement resource is positioned at the second downlink subframe set and is interlocked with the first interference measurement resource configuration, whether or not the interference measurement resource is valid can be configured to be determined irrespective of a zero-power channel state information-reference signal resource configuration (zero-power CSI-RS resource configuration).

To further achieve these and other advantages and in accordance with the purpose of the present invention, according to a different embodiment, a user equipment measuring interference in a wireless communication system includes an RF (radio frequency) unit and a processor, the processor configured to receive a first interference measurement resource configuration and a second interference measurement resource configuration for one channel state estimation process (channel state information process), the processor configured to measure interference from an interference measurement resource based on the first interference measurement resource configuration and the second interference measurement resource configuration. In this case, the first interference measurement resource configuration is configured for a first downlink subframe set which is configured not to change a usage of a radio resource by a usage change message and the second interference measurement resource configuration is configured for a second downlink subframe set which is configured to change a usage of a radio resource by a usage change message.

Advantageous Effects

According to the present invention, it is able to efficiently set an interference measurement resource in case of dynamically changing a radio resource according to a system load in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram illustrating structures of a control plane and a user plane of a radio interface protocol between a user equipment and E-UTRAN based on the 3GPP radio access network standard;

FIG. 18 is a diagram for a case of calculating timing of reporting channel state information such as RI information, PMI information, CQI information and the like by re-indexing available UL subframes only;

BEST MODE

Mode for Invention

Figure 1:
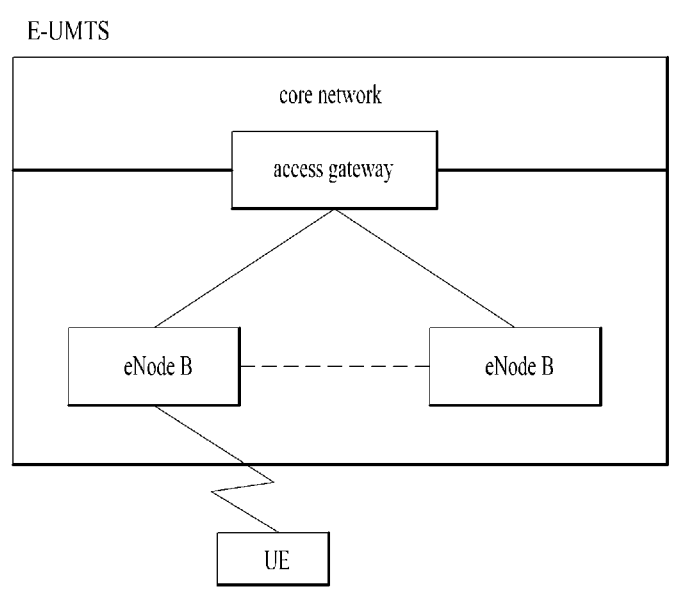
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
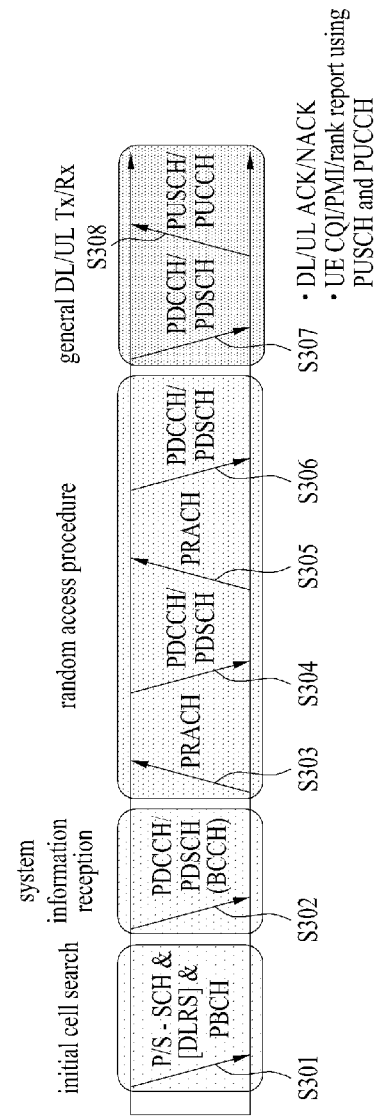
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
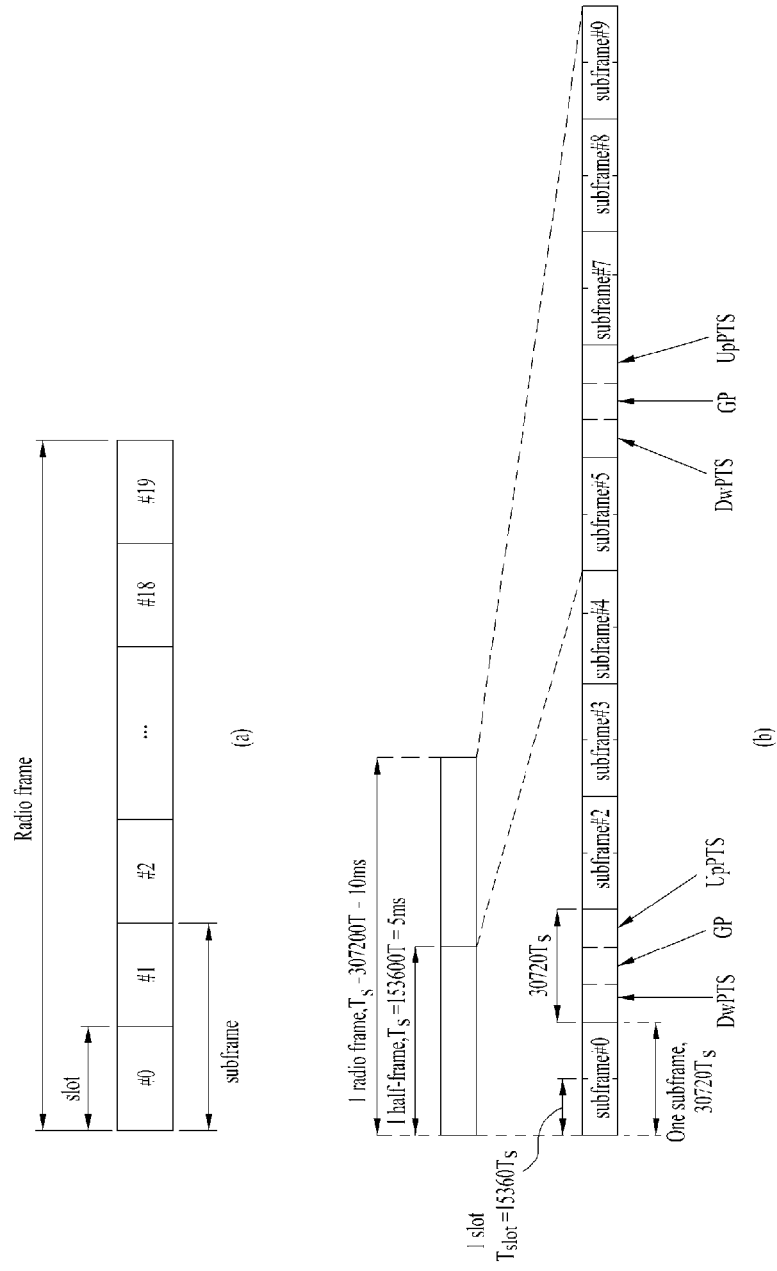
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s = 1/(15000 \times 2048)$, and the other region is configured for the guard period.

TABLE 1

| | | Normal cyclic prefix in downlink | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |
| 5 | $6592 \cdot T_S$ | $4384 \cdot T_S$ | $5120 \cdot T_S$ | $20480 \cdot T_S$ | | |
| 6 | $19760 \cdot T_S$ | | | $23040 \cdot T_S$ | | |
| 7 | $21952 \cdot T_S$ | | | $12800 \cdot T_S$ | | |
| 8 | $24144 \cdot T_S$ | | | — | — | — |
| 9 | $13168 \cdot T_S$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |

TABLE 2-continued

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
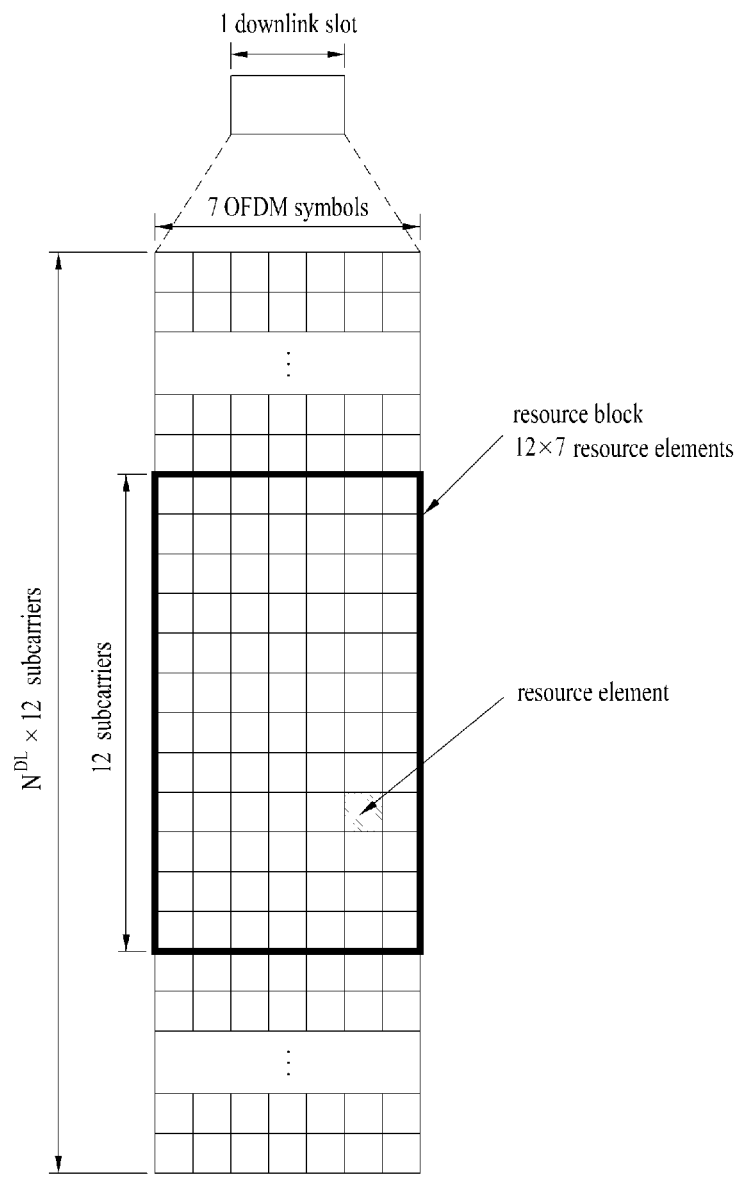
FIG. 5 is a diagram of a resource grid for a downlink slot.

FIG. 5 is a diagram for an example of a resource grid for a downlink slot.

Referring to FIG. 5, a downlink slot includes $N_{symb}^{DL}$ OFDM symbols in time domain and $N_{RB}^{DL}$ resource blocks in frequency domain. Since each resource block includes $N_{sc}^{RB}$ subcarriers, a downlink slot includes $N_{RB}^{DL} \times N_{sc}^{RB}$ subcarriers in frequency domain. FIG. 5 shows an example that a downlink slot includes 7 OFDM symbols and a resource block includes 12 subcarriers, by which the present invention may be non-limited. For example, the number of OFDM symbols included in a downlink slot may vary according to a length of a cyclic prefix (CP)

Each element on a resource grid is called a resource element (hereinafter abbreviated RE) and one resource element is indicated by a single OFDM symbol index and a single subcarrier index. One RB consists of $N_{symb}^{DL} \times N_{sc}^{RB}$ resource elements. The number ($N_{RB}^{DL}$) of resource blocks included in a downlink slot is dependent on a downlink transmission bandwidth configured in a cell.

Figure 6:
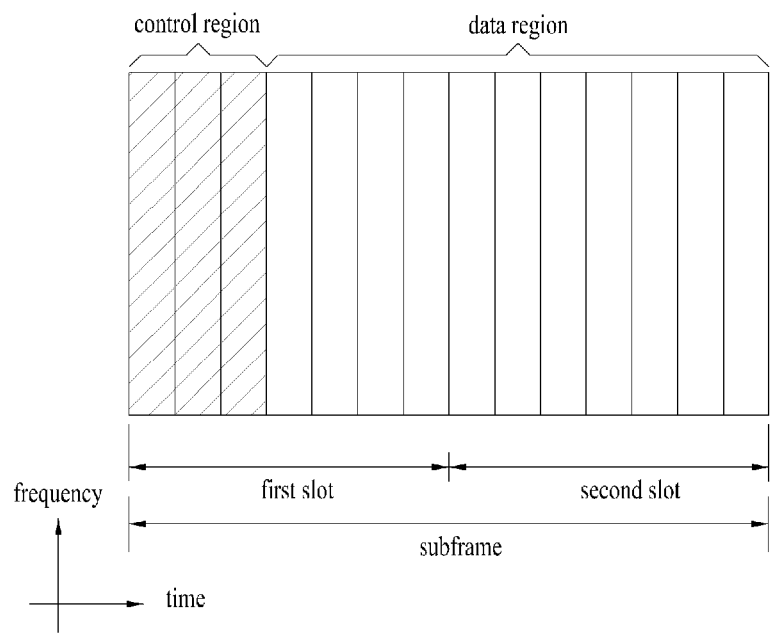
FIG. 6 is a diagram for an example of a structure of a downlink subframe.

FIG. 6 is a diagram for an example of a structure of a downlink subframe.

Referring to FIG. 6, maximum 3 (4) OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by LTE may include PCFICH (Physical Control Format Indicator Channel), PDCCH (Physical Downlink Control Channel), PHICH (Physical hybrid ARQ indicator Channel) and the like. The PCFICH carried on a first OFDM symbol of a subframe carries the information on the number of OFDM symbols used for the transmission of control channels within the subframe. The PHICH carries HARQ ACK/NACK (hybrid automatic repeat request acknowledgement/negative acknowledgement) signal in response to an UL transmission.

Control information carried on PDCCH may be called downlink control information (DCI). The DCI includes resource allocation information for a user equipment or a user equipment group and different control information. For example, the DCI includes DL/UL scheduling information, UL transmit (Tx) power control command and the like.

PDCCH is able to carry a transmission format and resource allocation information of DL-SCH (downlink shared channel), a transmission format and resource allocation information of UL-SCH (uplink shared channel), paging information on PCH (paging channel), system information on DL-SCH, resource allocation information of an upper layer control message such as a random access response transmitted on PDSCH, a transmit power control command set for individual user equipments within a user equipment (UE) group, a transmit power control command, activation indication information of VoIP (voice over IP) and the like. A plurality of PDCCHs can be transmitted in a control region and a user equipment is able to monitor a plurality of the PDCCHs. PDCCH is transmitted on an aggregation of a plurality of contiguous control channel elements (CCEs). A CCE is a logical assignment unit used to provide PDCCH with a code rate in accordance with a state of a radio channel. A CCE corresponds to a plurality of REGs (resource element groups). A format of PDCCH and the number of bits of PDCCH are determined by the number of the CCEs. A base station determines a PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or usage of PDCCH. If the PDCCH is provided for a specific user equipment, the CRC can be masked with an identifier of the corresponding user equipment, i.e., C-RNTI (i.e., Cell-RNTI). As a different example, if the PDCCH is provided for a paging message, the CRC can be masked with a paging identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). If the PDCCH is provided for a random access response, the CRC can be masked with RA-RNTI (random access-RNTI).

Figure 7:
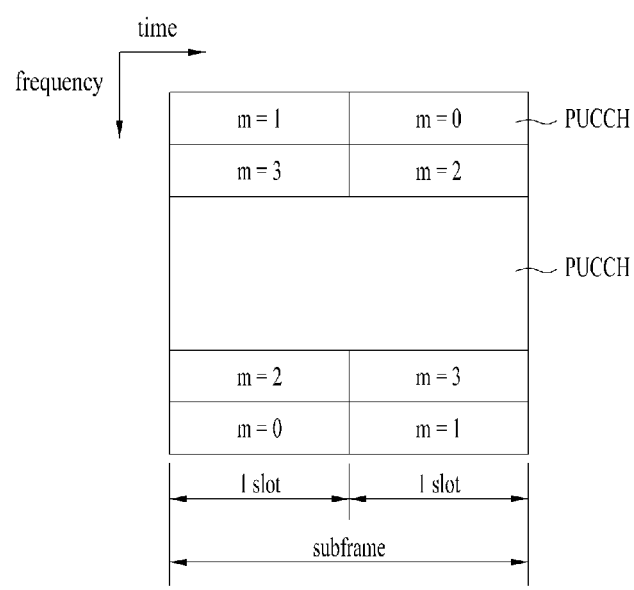
FIG. 7 is a diagram for an example of a structure of an uplink subframe in LTE.

FIG. 7 is a diagram for an example of a structure of an uplink subframe in LTE.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for a DL data packet on PDSCH. This information indicates whether or not a DL data packet is successfully received.

ACK/NACK 1 bit is transmitted in response to a single DL codeword. ACK/NACK 2 bits are transmitted in response to two DL codewords.

CSI (channel state information): Feedback information on a DL channel. CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

In the following, CoMP (Cooperative Multipoint Transmission/Reception) is explained.

A system appearing after LTE-A intends to introduce a scheme of enhancing performance of a system, which is enhanced by enabling many cells to cooperate with each other. This sort of scheme is called a cooperative Multipoint Transmission/Reception (hereinafter abbreviated CoMP). The CoMP is a scheme used by 2 or more base stations, access points or cells to cooperatively communicate with a user equipment to smoothly perform communication between the specific user equipment and the base stations, the access points or the cells. Throughout the present invention, a base station, an access point or a cell can be used as an identical meaning.

In general, inter-cell interference may decrease performance of a user equipment situated at a cell boundary and throughput of an average sector in a multi-cell environment where a frequency reuse index corresponds to 1. In order to reduce the inter-cell interference, a legacy LTE system adopted a simple and passive method such as a fractional frequency reuse (FFR) via UE-specific power control for a user equipment situated at a cell boundary to have a reasonable performance efficiency in an interference-limited environment. Yet, instead of reducing the use of frequency resource per each cell, it may be more preferable to reduce the ICI or reuse the ICI with a signal desired by a user equipment. In order to achieve the aforementioned purpose, the CoMP transmission scheme can be applied.

Figure 8:
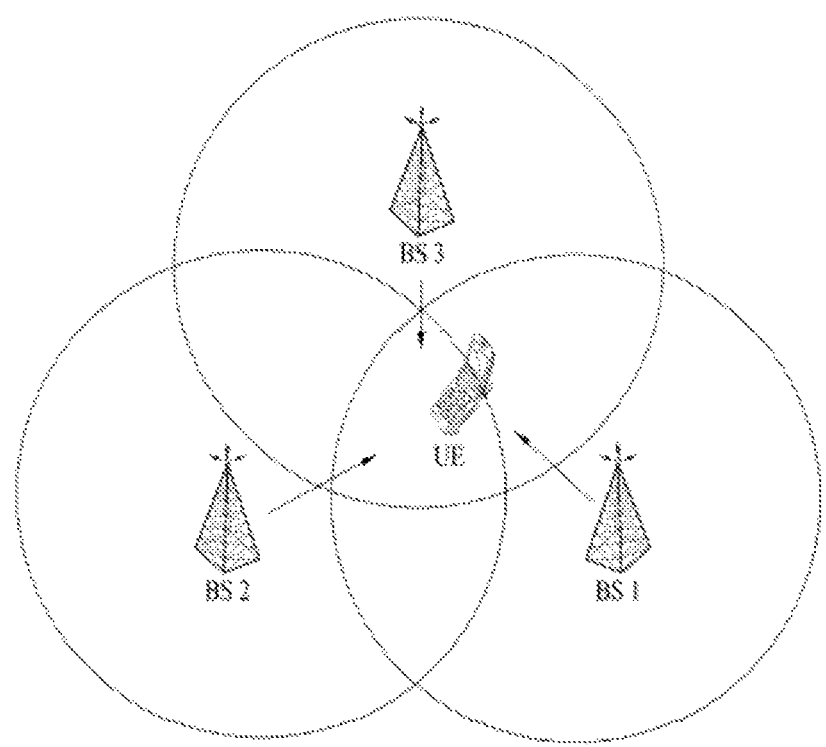
FIG. 8 is a diagram for an example of performing CoMP.

FIG. 8 is a diagram for an example of performing CoMP. Referring to FIG. 8, a wireless communication system includes a plurality of base stations (a BS 1, a BS 2 and a BS 3) performing the CoMP and a user equipment. A plurality of the base stations (the BS 1, the BS 2 and the BS 3) performing the CoMP can efficiently transmit data to the user equipment in a manner of cooperating with each other. The CoMP can be mainly classified into two types according to whether data is transmitted from each of a plurality of the base stations performing the CoMP:

Joint processing (CoMP Joint Processing (CoMP-JP))
Cooperative scheduling/beamforming (CoMP-CS/CB)

According to the CoMP-JT, data are simultaneously transmitted to a user equipment from each of a plurality of the base stations performing the CoMP and the user equipment increases reception capability by combining signals transmitted from each of a plurality of the base stations with each other. In particular, according to the CoMP-JP scheme, data can be used in each point (base station) of CoMP cooperation units. The CoMP cooperation units indicate a set of base stations used for a cooperative transmission scheme. The JP scheme can be classified into a joint transmission scheme and a dynamic cell selection scheme.

The joint transmission scheme means a scheme that PDSCHs are simultaneously transmitted from a plurality of transmission points (a part or a whole of the CoMP cooperation units). In particular, data transmitted to single user equipment can be simultaneously transmitted from a plurality of the transmission points. According to the joint transmission scheme, quality of a received signal can be coherently or non-coherently enhanced and interference interfering a different user equipment may be actively eliminated as well.

The dynamic cell selection scheme means a scheme that PDSCH is transmitted from a single transmission point (of the CoMP cooperation units) at a time. In particular, data transmitted to single user equipment on a specific time is transmitted from a single point and different points of the CoMP cooperation units do not transmit data to the user equipment on the specific time. A point, which transmits data to the user equipment, can be dynamically selected.

On the contrary, in case of the CoMP-CS, data is transmitted to single user equipment on a random moment via a base station and scheduling or beamforming is performed to minimize interference from a different base station. In particular, according to the CoMP-CS/CB scheme, the CoMP cooperation units can cooperatively perform beamforming for the data transmission transmitted to the single user equipment. In this case, although the data is transmitted from a serving cell, user scheduling/beamforming can be determined by coordination of cells of the CoMP cooperation units.

Meanwhile, in case of UL, coordinated multi-point reception means to receive a signal transmitted by coordination of a plurality of points, which are geographically away from each other. A CoMP scheme applicable to a case of UL can be classified into Joint Reception (JR) and a coordinated scheduling/beamforming (CS/CB).

The JR scheme means that a signal transmitted via PUSCH is received by a plurality of reception points. The CS/CB scheme means that PUSCH is received by a single point and user scheduling/beamforming is determined by coordination of cells of the CoMP cooperation units.

In the following, inter-cell interference between a plurality of cells is explained.

If a part of coverages of two base stations is overlapped with each other like a case that two base stations (e.g., a base station #1 and a base station #2) are arranged in a manner of being adjacent to each other, a user equipment served by one base station may be severely interfered by a strong downlink signal of another base station. As mentioned in the foregoing description, if inter-cell interference occurs, the inter-cell interference can be reduced by using an inter-cell cooperative signaling scheme between two base stations. In various embodiments of the present invention described in the following, assume that a signal is smoothly transmitted and received between two interfering/interfered base stations. For instance, assume a case that transmission and reception of a cooperative signal is very reliable between base stations in a manner that there exists a wired/wireless link (e.g., backhaul link or Un interface) including a good transmission condition such as a transmission bandwidth, time delay or the like between two base stations. And, it may assume a case that time synchronization between two base stations is matched with each other within an allowable error range (e.g., edges of downlink subframes of two interfering/ interfered base stations are aligned) or a case that a difference (offset) of a subframe boundary between two base stations is clearly recognized by the two base stations.

Referring back to FIG. 8, the base station #1 (BS #1) corresponds to a macro base station serving a wide area with a high transmit power and the base station #2 (BS #2) corresponds to a micro base station (e.g., a pico base station) serving a small area with a low transmit power. As shown in an example of FIG. 8, if a UE, which is located at a cell boundary area of the base station #2 and served by the base station #2, is severely interfered by the base station #1, it may be difficult to perform efficient communication without an appropriate inter-cell cooperation.

In particular, in case of trying to lessen a service load of the base station #1, which is the macro base station, in a manner of making a large number of terminals to be connected with the base station #2, which is the micro base station of a low transmit power, it is highly probable to have a situation of the aforementioned inter-cell interference. For instance, when a user equipment intends to select a serving base station, the user equipment can calculate and compare reception power of each of downlink signals received from a plurality of base stations with each other in a manner of adding a prescribed adjusting value (a bias value) to reception power from the micro base station and not adding a prescribed adjusting value to reception power from the macro base station. By doing so, the user equipment can select a base station providing highest downlink reception power as the serving base station. Thus, more terminals can be connected to the micro base station. Although strength of a downlink signal actually received from the micro base station is weaker than strength of a signal received from the macro base station, the micro base station can be selected as a serving base station and the terminals connected with the micro base station may experience strong interference from the macro base station. In this case, if a separate inter-cell cooperation is not provided, it may be difficult for terminals located at the boundary of the micro base station to perform a proper operation due to the strong interference from the macro base station.

If there exist inter-cell interference between two base stations, it is necessary to perform appropriate cooperation between the interfering/interfered base stations to perform an efficient operation. A signal enabling the cooperative operation to be performed can be transceived via a link between the two base stations. In this case, if inter-cell interference occurs between a macro base station and a micro base station, the macro base station controls an inter-cell cooperative operation and the micro base station may perform an appropriate operation according to a cooperation signal informed by the macro base station.

The aforementioned inter-cell interference occurrence situation is just an example. It is apparent that embodiments of the present invention can be identically applied to a case (e.g., a case of inter-cell interference occurring between a HeNB of a CSG scheme and a macro base station of an OSG scheme, a case that a micro base station causes interference and a macro base station is interfered by the interference or a case that inter-cell interference exist between micro base stations or macro base stations and the like) different from the aforementioned situation.

Channel State Information Estimation and Reporting Method

Based on the aforementioned contents, the present invention proposes a method of efficiently estimating and reporting channel state information when a usage of a radio resource is dynamically changed according to a load state of a system.

In the following, for clarity, the present invention is explained based on 3GPP LTE system. However, a system range to which the present invention is applied can also be extended to a different system rather than the 3GPP LTE system. Embodiments of the present invention can also be extended in case that a resource on a specific cell (or a component carrier (CC)) is dynamically changing according to a load status of a system in environment to which carrier aggregation (CA) is applied. And, the embodiments of the present invention can also be extended in case that a usage of a radio resource is dynamically changing in a TDD system or a FDD system.

Figure 9:
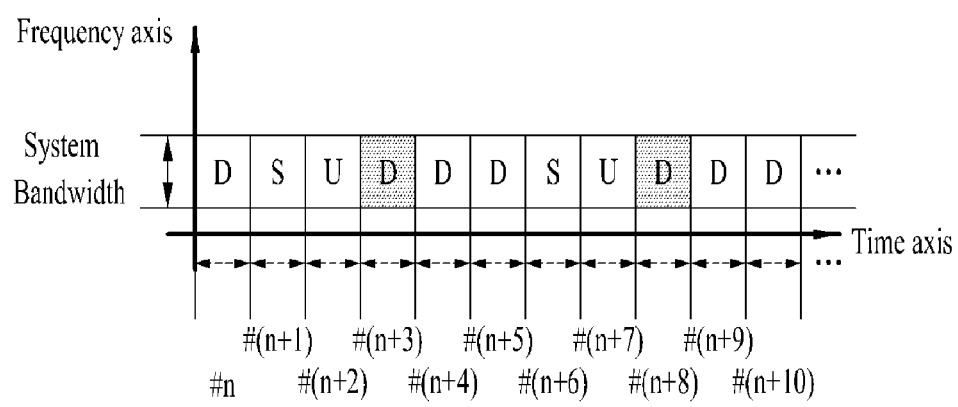
FIG. 9 is a diagram for a case of using a part of legacy UL resources in a manner of changing a usage of the part into a DL communication usage under TDD system environment.

FIG. 9 is a diagram for a case of using a part of legacy UL resources (i.e., UL SFs) in a manner of changing a usage of the part into a DL communication usage under TDD system environment. In FIG. 9, assume that UL-DL configuration configured through SIB corresponds to UL-DL #1 (i.e., DSUUDDSUUD). In this case, it is able to know that a legacy UL SF #(n+3) and a UL SF #(n+8) are used for a purpose of DL communication in a manner of being changed through a predetermined signal (e.g., physical/higher layer signal or system information signal).

Figure 10:
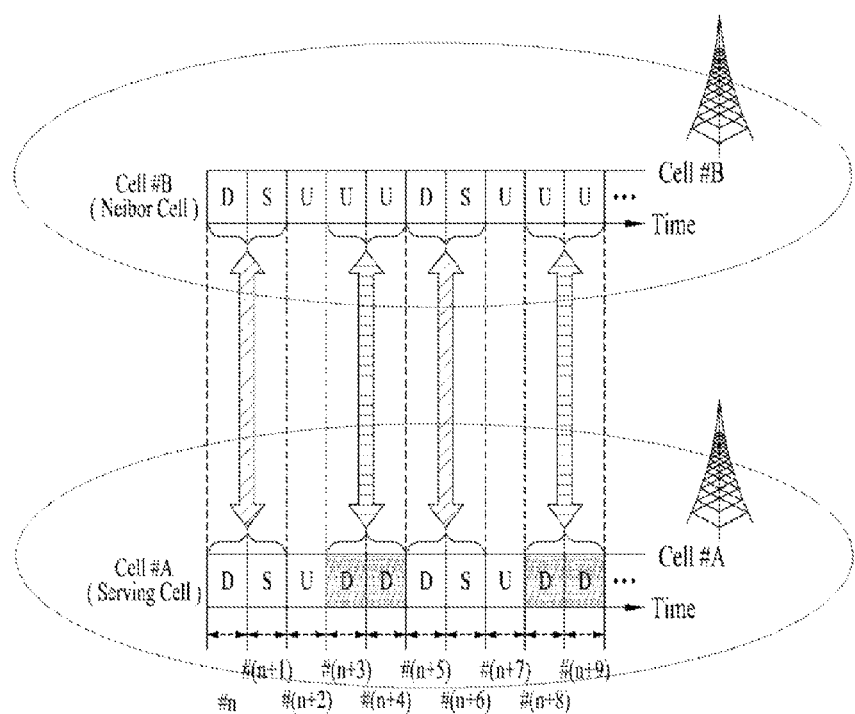
FIG. 10 is a diagram for a case that an interference characteristic received from the external is different from each other according to a subframe (or a subframe set) when each cell dynamically changes a usage of a legacy radio resource according to a system load state of the cell under TDD system environment.

FIG. 10 is a diagram for a case that an interference characteristic received from the external is different from each other according to a subframe (or a subframe set) when each cell dynamically changes a usage of a legacy radio resource according to a system load state of the cell under TDD system environment. In this case, for clarity, assume a situation that two cells (i.e., cell #A and cell #B) exist on a network and UL-DL configuration configured through SIB of each cell corresponds to UL-DL #0 (i.e., DSUUUD-SUUU). And, in FIG. 10, assume that a cell #A uses a legacy UL SF #(n+3), a UL SF #(n+4), a UL SF #(n+8), and UL SF #(n+9) in a manner of changing the subframes for the usage of DL communication according to the increase of downlink load amount of a system. In particular, assume that a legacy UL-DL configuration is used in a manner of being changed into UL-DL #2 (i.e., DSUDDDSUDD) by a usage change indicator.

Hence, in the aspect of the cell #A, a type of interference received on a DL resource can be classified into interference (i.e., SF #n, SF #(n+1), SF #(n+5), SF #(n+6)) between resources of an identical communication direction and interference (i.e., SF #(n+3), SF #(n+4), SF #(n+8), SF #(n+9)) between resources of communication direction different from each other. Moreover, the interference between the resources of the identical communication direction can be additionally classified into interference between resources that both a configuration on SIB and a current usage correspond to the DL communication direction and interference between resources that a configuration on SIB corresponds to a UL communication direction but a current usage corresponds to a DL communication direction.

The aforementioned additional classification method can be useful especially for a case of reducing interference interfering communication between a neighboring base station using a legacy UL resource as a legacy usage (e.g., UL communication) via relatively low power configuration and a UE when the legacy UL resource is used in a manner of being changed to a DL communication usage. Hence, when a usage of a legacy radio resource is dynamically changed according to a load state of a system, if channel state (CSI) estimation (interference estimation) and reporting are performed without considering interference characteristic, which is different from each other according to a DL subframe (or subframe set), overall network communication capability can be deteriorated due to inaccurate channel state information.

Hence, the present invention proposes a method of efficiently performing channel state estimation (or interference estimation) and reporting in consideration of interference characteristic different from each other according to a radio resource set when a usage of a radio resource is dynamically changing according to a system load state. In this case, a radio resource set of a different interference characteristic can be identified based on a predetermined rule. For example, resource sets can be classified into a resource set in which communication of an identical direction is performed between cells and a resource set in which communication of a different direction is performed between cells.

In the following, for clarity, information on a channel state estimation process (CSI process) corresponds to information informed by a base station to a UE to estimate a channel state between a specific cell and the UE. As an example, the information on the channel state estimation process (CSI process) can include a type of a reference signal used for the channel state estimation, a configuration, periodicity, a subframe offset, a virtual cell ID (or a physical cell ID) for generating sequence of a reference signal and the like.

And, information on an interference measurement resource (IMR) corresponds to a resource informed by a base station to a UE to efficiently measure external interference received on communication between a specific cell and the UE. As an example, the interference measurement resource can be defined based on a predetermined resource unit (or configuration/periodicity/subframe offset).

Information on resource-specific CSI measurement (or restricted CSI measurement) corresponds to information informed by a base station to a UE to respectively perform independent channel state estimation (or interference estimation) and a reporting operation on a radio resource set of which interference characteristic is different from each other. As an example, the information on the resource-specific CSI measurement (or restricted CSI measurement) can consist of information on a radio resource set of which an interference characteristic is different from each other and configuration information (e.g., channel state reporting period/subframe offset/uplink resource index, etc.) for respectively performing independent channel state report on a radio resource set of which interference characteristic is different from each other.

In the following description, for clarity of explaining the proposed scheme, assume a situation that each cell dynamically changes a usage of a legacy radio resource according to a system load state of the cell under TDD system environment. The proposed scheme of the present invention can be extensively applied not only to a situation that a usage of a radio resource is dynamically changing according to a system load state in FDD system but also to a situation that two or more radio resource sets of which interference characteristic is different from each other are defined.

As an embodiment of the present invention, a base station can inform a UE of "information on a single channel state estimation process and information on a single interference measurement resource interlocked with the channel state estimation process" and "information on single resource-specific CSI measurement (or restricted CSI measurement)" to make the UE respectively perform independent channel state estimation (or interference estimation) and reporting on radio resource sets of which interference characteristic is different from each other.

In this case, the interference measurement resource is defined by a common interference measurement resource (between radio resource sets of which interference characteristic is different from each other) instead of being independently designated according to a radio resource set of which interference characteristic is different from each other. And, in order to make an interference measurement resource show up on all radio resource sets of which interference characteristic is different from each other, the information on the interference measurement resource can be configured by parameters for a (legacy) specific interference measurement resource and an additional offset parameter. For example, if appearing timing of a period T-based specific interference measurement resource corresponds to SF #(n+i*T) (in this case, i is an integer equal to or greater than 0), the additional offset parameter (i.e., $K_{OFFSET}$) plays a role in indicating that the interference measurement resource additionally appears at SF #(n+i*T+$K_{OFFSET}$).

It is able to configure a time position of an interference measurement resource, which is valid according to a radio set of which interference characteristic is different from each other, to be deducted from information on a time position of each radio set informed by a base station to a UE. Or, it is able to configure a time position of an interference measurement resource, which is valid according to a radio set of which interference characteristic is different from each other, to be deducted from information on a time position of each of restricted CSI measurement subframe sets informed by a base station to a UE. In this case, the restricted CSI measurement subframe sets may perform a function of determining i) a type of restricted CSI measurement subframe set, ii) a type of channel state information, iii) a type of interference measurement value interlocked with an aperiodic channel state report which is triggered in subframes in which an interference measurement resource is not set.

For example, if radio resource sets of which interference characteristic is different from each other are defined by two subframe sets, a time position of a valid interference measurement resource of a specific subframe set may be restricted to interference measurement resources existing on the specific subframe set only. In particular, information on the time position of the radio sets of which interference characteristic is different from each other can be interpreted as an indicator for implicitly indicating a time position of an interference measurement resource which is valid according to a radio set. Hence, a UE can independently perform an interference estimation operation on individual sets using an interference measurement resource existing in each subframe set only. And, the UE independently calculates channel state information (e.g., CQI, PMI, RI) for each of the sets based on interference estimation values for the individual sets and transmits predetermined channel state reporting-related parameters per set (e.g., periodicity/subframe offset/UP resource index, etc.) to the base station.

Figure 11:
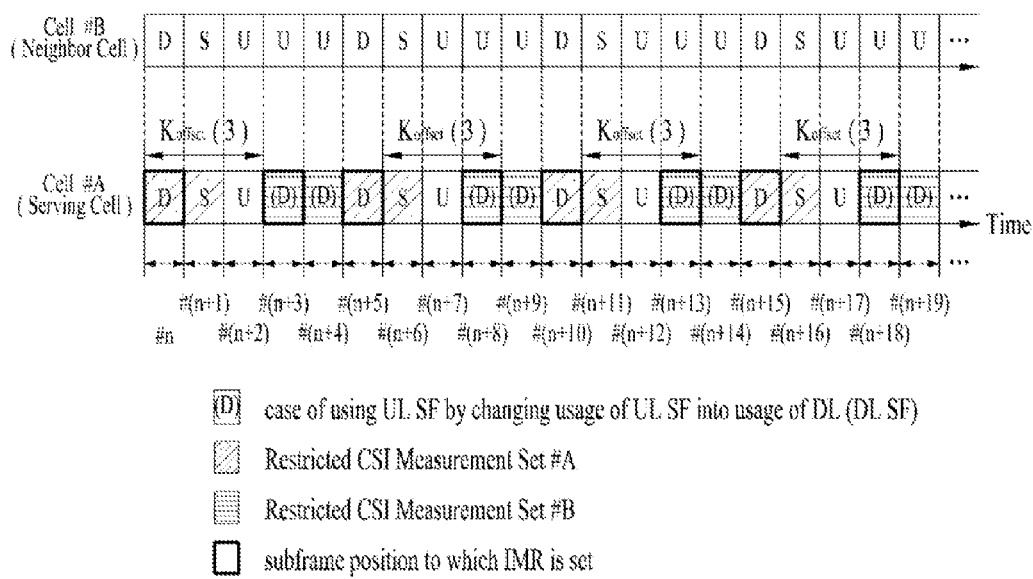
FIGS. 11 to 14 are diagrams for an embodiment of performing independent channel state estimation (or interference estimation) and reporting on each of radio resource sets of which an interference characteristic is different from each other according to the present invention.

FIG. 11 shows an embodiment that a UE performs independent channel state estimation (or interference estimation) and reporting on each of radio resource sets based on 'information on a single channel state estimation process and information on a single interference measurement resource interlocked with the channel state estimation process' and 'information on single restricted CSI measurement' received from a base station according to the present invention.

In FIG. 11, assume a TDD system and assume UL-DL configuration configured through SIB of an individual cell corresponds to UL-DL configuration #0 (i.e., DSUUUD-SUUU). And, In FIG. 11, assume that a cell #A uses a legacy UL SF #(n+3), a UL SF #(n+4), UL SF #(n+8), a UL SF #(n+9), a UL SF #(n+13), a UL SF #(n+14), a UL SF #(n+18) and a UL SF #(n+19) in a manner of changing a usage of the subframes to DL communication according to the increase of downlink load amount of a system. Moreover, assume that information on an interference measurement resource is configured by an additional offset value 3 together with a specific 4-port CSI-RS configuration (e.g., zero-power CSI-RS configuration) based on periodicity of 5 ms and subframe offset 0. And, assume that radio resource sets of different interference characteristic in which restricted CSI measurement is performed are defined by two subframe sets (i.e., set #A and set #B). The two subframe sets are classified into a resource set in which communication of an identical direction is performed between cells and a resource set in which communication of a different direction is performed between cells.

Referring to FIG. 11, a UE uses an interference measurement resource (i.e., interference measurement resource on an SF #n, an SF # (n+5), an SF # (n+10) and an SF # (n+15)) existing on the set #A only to perform interference estimation on the set #A. The UE independently reports channel state estimation information (e.g., CQI, PMI, RI) related to the set #A, which is calculated based on a corresponding interference estimation value, to the base station according to predetermined set #A-related channel state reporting parameters (e.g., periodicity/subframe offset/UL resource index, etc.). Similarly, the UE performs interference estimation/channel state estimation/channel reporting operation on the set #B using a scheme identical to the aforementioned scheme applied to the set #A.

As a different embodiment of the present invention, it may be able to configure a base station to inform a UE of "information on a single channel state estimation process and information on a plurality of interference measurement resources interlocked with the channel state estimation process" and "information on single resource-specific CSI measurement (or restricted CSI measurement)" through a predefined signal.

In this case, the total number of interference measurement resources can be equally configured by the number of radio resource sets of which interference characteristic is different from each other. Hence, an independent interference measurement resource can be defined according to a radio resource set of a different interference characteristic.

Hence, the UE can independently perform an interference estimation operation on an individual set using an interference measurement resource respectively interlocked with each of the radio resource sets. And, the UE independently calculates channel state information (e.g., CQI, PMI, RI) on each of the radio resource sets based on an interference estimation value for an individual radio resource set and transmits predefined channel state reporting-related parameters (e.g., periodicity/subframe offset/UL resource index, etc.) per set to the base station.

And, the total number of interference measurement resources can also be configured by a predetermined specific value. For example, the total number of interference measurement resources can be configured by a value smaller or greater than the number of radio resource sets of which interference characteristic is different from each other.

In addition, a time position of an interference measurement resource, which is valid according to a radio resource set of which interference characteristic is different from each other, can be configured to be deducted from information on a time position of each radio resource set informed by a base station to a UE. Or, a time position of an interference measurement resource, which is valid according to a radio resource set of which interference characteristic is different from each other, can be configured to be deducted from information on a time position of each of restricted CSI measurement subframe sets. In this case, the restricted CSI measurement subframe sets may perform a function of determining i) a type of restricted CSI measurement subframe set, ii) a type of channel state information, or iii) a type of interference measurement value interlocked with an aperiodic channel state report which is triggered in subframes in which an interference measurement resource is not set. The aforementioned method may be useful especially for a case that a time position of a specific radio set of which an interference characteristic is different is not (partly) matched with a time position of an interference measurement resource configured for the radio set.

As an example, if radio resource sets of which an interference characteristic is different from each other are defined by two subframe sets, a time position of a valid interference measurement resource of a specific subframe set may be restricted to interference measurement resources existing on the specific subframe set only among interference measurement resources configured for the specific radio resource set.

As a different example, interference measurement resources independently defined according to a radio resource set of which an interference characteristic is different from each other or interference measurement resources defined by the number of predetermined specific value can be independently (differently) defined in i) a time resource region and/or ii) a frequency resource region and/or iii) a sequence resource region or can be defined to be overlapped with each other in a partial resource region. For example, if a plurality of interference measurement resources are differently defined in the frequency resource region (and/or the sequence resource region), all (a part) of time positions of an interference measurement resource, which is valid according to a radio resource set of which interference characteristic is different from each other, can be configured to be overlapped with each other through a predefined signal.

Figure 12:
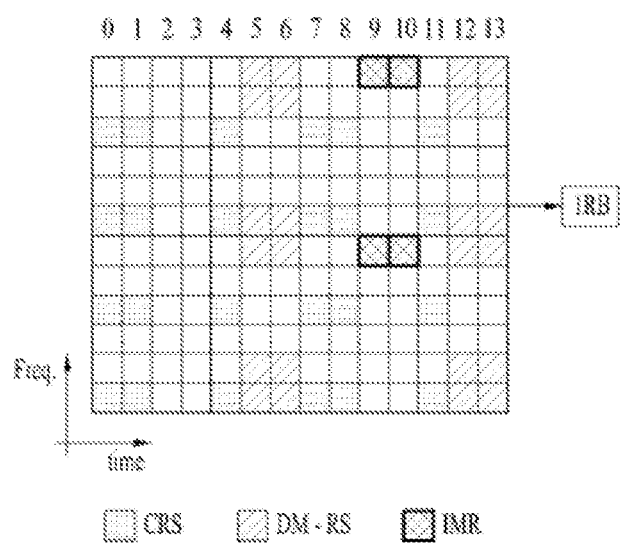

FIG. 12 shows an embodiment that an interference measurement resource (IMR) is mapped to a single resource block (RB) according to the aforementioned description in case of a normal CP (cyclic prefix).

Figure 13:
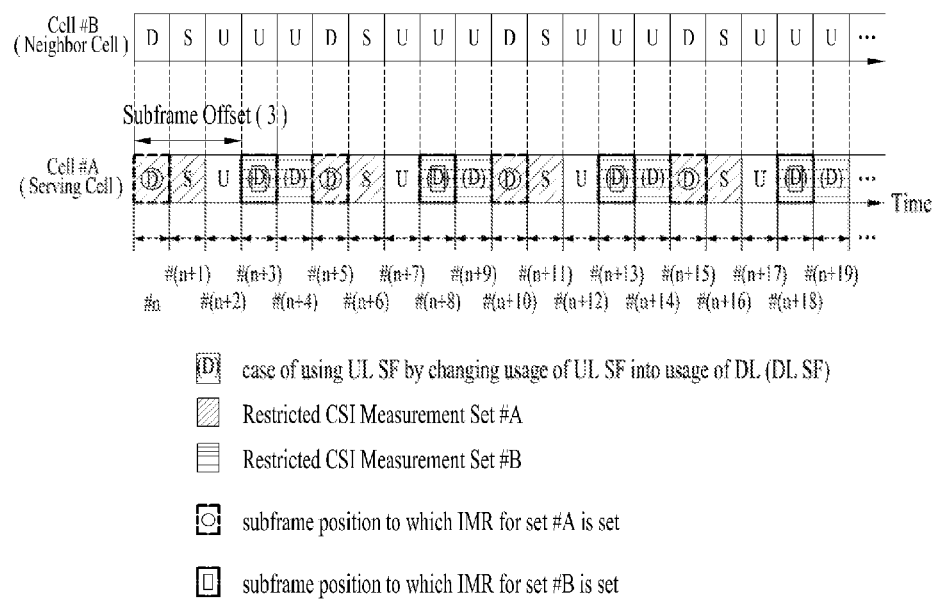

FIG. 13 shows an embodiment that a UE performs independent channel state estimation (or interference estimation) and reporting on each of radio resource sets of which an interference characteristic is different from each other based on "information on single channel state estimation process and information on two interference measurement resources interlocked with the channel state estimation process" and "information on single restricted CSI measurement" received from a base station according to the present invention. In this case, assume that system environment and positions of radio resources of which a usage is changing are identical to the case of FIG. 11.

In FIG. 13, assume that the radio resource sets of which the interference characteristic is different from each other on which the restricted CSI measurement is performed are defined by two subframe sets (i.e., set #A and set #B) and assume that an independent interference measurement resource is configured according to a radio resource set of which an interference characteristic is different from each other. Specifically, assume that interference measurement resource information of the set #A and interference measurement resource information of the set #B are defined by a specific 4-port CSI-RS configuration (e.g., zero-power CSI-RS configuration) based on 5 ms periodicity and subframe offset 0 and a specific 4-port CSI-RS configuration (e.g., zero-power CSI-RS configuration) based on 5 ms periodicity and subframe offset 3, respectively.

In FIG. 13, a UE performs an interference estimation operation on the set #A using an interference measurement resource related to the set #A (i.e., interference measurement resource on an SF #n, an SF #(n+5), an SF #(n+10) and an SF #(n+15)) existing on the set #A only and independently reports channel state estimation information (e.g., CQI, PMI, RI) related to the set #A, which is calculated based on a corresponding interference estimation value, to a base station according to predefined channel state reporting parameters (e.g., periodicity/subframe offset/UL resource index, etc.) related to the set #A. Similarly, the UE can perform interference estimation/channel state estimation/channel reporting operation on the set #B using a scheme identical to a case of the aforementioned set #A.

As a further different embodiment of the present invention, it may be able to configure a base station to inform a UE of "information on a single channel state estimation process and information on a plurality of interference measurement resources interlocked with the channel state estimation process" through a predefined signal.

In this case, the total number of interference measurement resources can be equally configured by the number of radio resource sets of which interference characteristic is different from each other (or, the number of subframe sets for restricted CSI measurement) or can be configured by a predetermined specific value (e.g., a value smaller or greater than the number of radio resource sets of which an interference characteristic is different from each other). And, the UE can independently perform an interference estimation (or channel estimation) operation on an individual set using interference measurement resources respectively interlocked with each of the sets.

In the following, for clarity of explaining the present embodiment, assume a situation that information on two interference measurement resources are set to a single channel state estimation process. In this case, assume that subframe sets (e.g., a downlink subframe set of a fixed usage and a downlink subframe set generated by a usage change operation) of which an interference characteristic is different from each other are interlocked with each other according to an interference measurement resource.

And, resource-specific CSI measurement (or restricted CSI measurement) subframe sets, which are defined for a single channel state estimation process, are defined not only to make each interference measurement resource designate timings (subframe positions) valid for measuring interference but also to determine i) a type of a resource-specific CSI measurement, ii) a type of channel state information or iii) a type of an interference measurement value interlocked with an aperiodic CSI report, which is triggered at timings (subframes) in which an interference measurement resource is not configured.

As a further different embodiment of the present invention, it may be able to configure a base station to inform a UE of "information on a plurality of channel state estimation processes and information on an interference measurement resource interlocked with each of a plurality of the channel state estimation processes".

In this case, the total number of channel state estimation processes can be equally configured by the number of radio resource sets of which interference characteristic is different from each other and an independent interference measurement resource can be defined according to a channel state estimation process. Hence, an independent channel state estimation process can be defined according to a radio resource set of a different interference characteristic. Hence, the UE can independently perform an interference estimation operation on an individual radio resource set of which an interference characteristic is different from each other using an interference measurement resource respectively interlocked with each of a plurality of the channel state estimation processes. And, the UE independently calculates channel state information (e.g., CQI, PMI, RI) for each of the sets based on an interference estimation value for an individual set and transmits predefined channel state reporting-related parameters (e.g., periodicity/subframe offset/UL resource index, etc.) per a predefined channel estimation process (or set) to the base station.

As a different example, the total number of channel state estimation processes and/or the total number of interference measurement resources can be configured by a predetermined specific value. For example, the total number of channel state estimation processes can be configured by a value smaller or greater than the number of radio resource sets of which interference characteristic is different from each other. Or, the majority number (e.g., M>0, where M is an integer) of channel state estimation processes can be configured by a type of sharing the relatively smaller number (e.g., M>N>0, where N is an integer) of interference measurement resources. In this case, a base station can additionally inform a UE of information on a radio resource set of which an interference characteristic is different from each other, configuration information (e.g., channel state reporting period/subframe offset/UL resource index, etc.) for an independent channel state report on each radio resource set of which an interference characteristic is different from each other and the like through a predefined signal. It is able to configure a time position of an interference measurement resource, which is valid according to a channel state estimation process, to be deducted from information on a time position of a radio resource set (of which an interference characteristic is different from each other) interlocked with each of the channel state estimation processes informed by the base station to the UE. The aforementioned method may be useful especially for a case that a time position of a specific radio resource set (of which an interference characteristic is different) interlocked with a specific channel state estimation process is not (partly) matched with a time position of an interference measurement resource configured for the process.

For example, if radio resource sets of which an interference characteristic is different from each other are defined by two subframe sets and an independent channel state process and an interference measurement resource are configured according to each subframe set, a time position of a valid interference measurement resource of a subframe set interlocked with a specific channel state estimation process may be restricted to interference measurement resources existing on a corresponding subframe set only among interference measurement resources configured for the corresponding process.

As a further different example, interference measurement resources independently defined according to a channel state estimation process (i.e., an individual radio resource set of which an interference characteristic is different from each other) or interference measurement resources defined by the number of predetermined specific value can be independently (e.g., differently) defined in i) a time resource region and/or ii) a frequency resource region and/or iii) a sequence resource region or can be defined to be overlapped with each other in a partial resource region. In this case, if a plurality of interference measurement resources are differently defined in the frequency resource region (and/or the sequence resource region), all (a part) of time positions of an interference measurement resource, which is valid according to a channel state estimation process (i.e., an individual radio resource set of which an interference characteristic is different from each other), can be configured to be overlapped with each other through a predefined signal.

Figure 14:
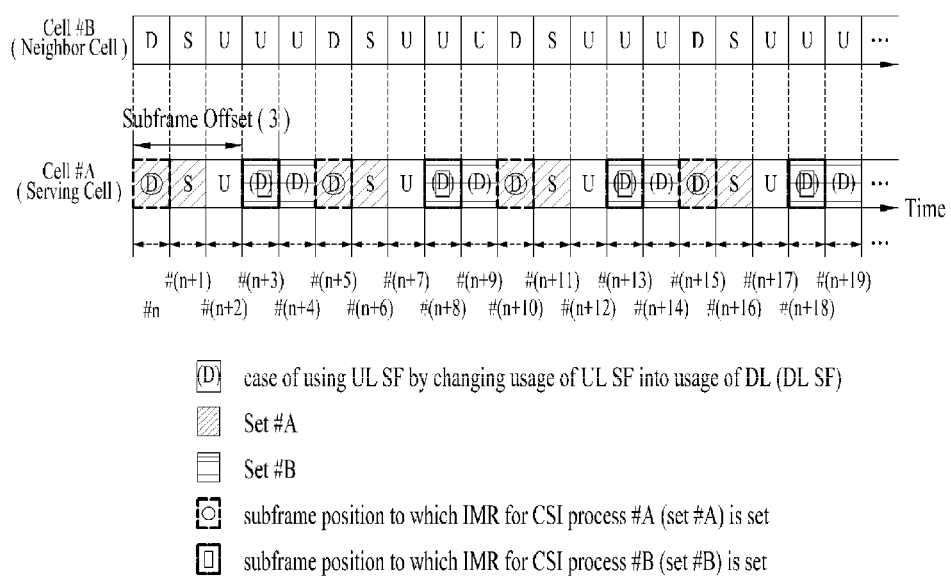

FIG. 14 shows an embodiment that a UE performs independent channel state estimation (or interference estimation) and reporting on each of radio resource sets of which an interference characteristic is different from each other based on "information on two channel state estimation processes and information on interference measurement resources interlocked with each of the channel state estimation processes" received from a base station according to the present invention.

In FIG. 14, assume that system environment and positions of radio resources of which a usage is changing are identical to the case of FIG. 11. In FIG. 14, assume that the radio resource sets of which the interference characteristic is different from each other are defined by two subframe sets (i.e., set #A and set #B) and assume that an independent channel state process (i.e., CSI process #A, CSI process #B) and an interference measurement resource (i.e., IMR #A, IMR #B) are configured according to each subframe set. Specifically, assume that an interference measurement resource of the set #A and an interference measurement resource of the set #B are defined by a specific 4-port CSI-RS configuration (e.g., zero-power CSI-RS configuration) based on 5 ms periodicity and subframe offset 0 and a specific 4-port CSI-RS configuration (e.g., zero-power CSI-RS configuration) based on 5 ms periodicity and subframe offset 3, respectively.

In FIG. 14, a UE performs an interference estimation operation on the set #A using an interference measurement resource related to the CSI process #A (i.e., interference measurement resource on an SF #n, an SF #(n+5), an SF #(n+10) and an SF #(n+15)) existing on the set #A only and can independently report channel state estimation information (e.g., CQI, PMI, RI) related to the set #A, which is calculated based on a corresponding interference estimation value, to a base station according to predefined channel state reporting parameters (e.g., periodicity/subframe offset/UL resource index, etc.) related to the set #A. And, the UE can perform interference estimation/channel state estimation/channel reporting operation on the set #B using a scheme identical to the case of the aforementioned set #A.

As a further different embodiment of the present invention, in a situation that a base station is configured to inform a UE of "information on a plurality of channel state estimation processes (CSI processes) and information on an interference measurement resource (IMR) interlocked with each of a plurality of the channel state estimation processes", due to complexity (or processing time) of a channel state estimation operation (or complexity of an operation of driving a plurality of channel state estimation processes at the same time) of the UE, it may be able to configure an operation to be emulated as a case of configuring the predetermined number of channel state estimation processes (e.g., N, M>N>0)(or the number equal to or smaller (e.g., N, M≥N>0)) relatively smaller than the actual number of channel state estimation processes (e.g., M, M>0).

As a different example, the proposed scheme can be extended to a case of considering the M number of channel state estimation processes as the predetermined integer number (e.g., N, M>N>0) of channel state estimation processes smaller than the M number of channel state estimation processes. In particular, the proposed scheme can be useful for channel estimation operations of UEs incapable of managing the relatively large number of channel state estimation processes (two or more channel state estimation processes) at the same time.

In the following description, for clarity of explaining an embodiment of the present invention, assume a situation that two channel state estimation processes operate in a manner of emulating the situation as a case of configuring a single channel state estimation process. In this case, as an example, assume that each of the two channel state estimation processes is defined for an independent interference estimation/channel state estimation/channel report operation for two radio resource sets (e.g., a downlink subframe set of a fixed usage and a downlink subframe set generated for a usage change operation) of which an interference characteristic is different from each other.

According to an embodiment of the present invention, for example, the two channel state estimation processes can be considered as TDM restricted CSI measurement of a single channel state estimation process in a manner of assigning conditions including i) a condition that valid measurement timings of an interference measurement resource according to the two channel state estimation processes are configured not to be matched with each other and/or ii) a condition that an additional CSI measurement subframe set (or restricted CSI measurement subframe set) is not set to the two channel state estimation processes and/or iii) a condition that channel state information of the two channel state estimation processes are not indicated to be reported at the same time when an operation related to an aperiodic CSI report is performed. Hence, if the two channel state estimation processes operate in a manner of being recognized as TDM restricted CSI measurement of a single channel state estimation process, the TDM restricted CSI measurement operation for a specific radio resource set of which an interference characteristic is different from each other can be considered as being performed based on i) an interference measurement resource or ii) a reference signal configuration for estimating a channel state of a channel state estimation process among the two channel state estimation processes interlocked with the legacy radio resource set.

And, timing of a channel state information reference resource (CSI reference resource) is affected by conditions such as i) the total number of configured channel state estimation processes and/or ii) a type of transmission mode (e.g., TM 1 to 9 type and TM 10 type) and/or iii) a system type (e.g., FDD system type and TDD system type).

Hence, when the embodiment of the present invention is applied, timing of a channel state information reference resource can be configured to be determined based on the predetermined number of channel state estimation processes (e.g., a single channel state estimation process) relatively smaller than the actual number of channel state estimation processes instead of determining the timing of the channel state information reference resource in a manner of considering as a plurality of (e.g., two) channel state estimation processes are configured (i.e., the number of valid channel state estimation processes is considered as one).

In particular, if the M number of channel state estimation processes are operated in a manner of being considered as the predetermined integer number (e.g., N, M>N) (or, an integer equal to or less than the predetermined M (e.g., N, M≥N>0) of channel state estimation processes smaller than the M number of channel state estimation processes, timing of a channel state information reference resource can be defined in a manner of being identical to a case of configuring the integer number (or, the integer number equal to or less than M) (i.e., N) of channel state estimation processes smaller than the M (i.e., the number of valid channel state estimation processes is considered as an integer smaller than the predetermined M).

In this case, the final number of channel state estimation processes for finally determining timing of a channel state information reference resource can be defined as a concept of "the number of valid channel state estimation processes".

For example, assume that each of two channel state estimation processes is used for independent i) interference estimation and/or ii) channel state estimation and/or iii) channel report operation for a legacy downlink subframe set of which an interference characteristic (of a serving base station) is different from each other and an uplink subframe set of which a usage is changed. And, assume that another two channel state processes are additionally used for a different purpose (e.g., purpose of measuring a channel state between base stations participating in a cooperative communication (CoMP) operation and a corresponding UE. In this case, the former two channel state estimation processes can be considered as a single channel state estimation process depending on an embodiment of the present invention. Hence, according to the present embodiment, the number of valid channel state estimation processes can be considered as three instead of four in total. Hence, timing of a channel state information reference resource can be determined by a previous valid downlink subframe including 4 ms from an uplink subframe in which (periodic or aperiodic) channel state report is performed based on the three valid channel state estimation processes.

For reference, if the total number of channel state estimation processes is set to 4 in total in TDD system, timing of a channel state information reference resource is determined by a previous valid downlink subframe including 5 ms from an uplink subframe in which (periodic or aperiodic) channel state report is performed. In this case, the valid downlink subframe can be defined by i) a downlink subframe of a usage fixed (static) according to a predetermined rule (e.g., in case of TDD system, a subframe #0, #1, #5 and #6 in which system information/synchronization information channel (e.g., PBCH (MIB), SIB, PAGING, PSS/SSS) is transmitted and/or ii) a downlink subframe on SIB and/or iii) an uplink subframe of which a usage is changed and/or iv) an uplink subframe on SIB but the uplink subframe configured for a downlink usage by a usage change operation.

As a different example, if a specific UE receives data/control information based on a cooperative communication (CoMP) operation between two base stations and each of the two base stations dynamically changes a radio resource usage according to a load state of the base station, total 4 channel state estimation processes can be defined for the specific UE in consideration of resource sets of two different interference characteristics, which are generated by a radio resource usage change operation of a serving base station, and a channel state respectively measured from each of the base stations participating in the CoMP. In this case, 'two channel state estimation processes for the resource sets of the two different interference characteristics, which are generated by a radio resource usage change operation of a serving base station' and 'two channel state estimation processes for measuring channel state of each base station participating in CoMP' can be respectively considered as a single channel state estimation process or a case of configuring a single channel state estimation process. Hence, the final number of channel state estimation processes (i.e., the number of valid channel state estimation processes) for finally determining timing of a channel state information reference resource can be deducted by two in total.

And, according to the present embodiment, two (or a plurality of) channel state estimation processes, which are considered as a single valid channel state estimation process, can be configured to be interlocked with an identical non-zero power CSI-RS configuration or a specific non-zero power reference signal configuration for a channel estimation usage.

In addition, a base station can inform a UE of whether to apply the aforementioned configurations and/or information on the proposed rules through a predetermined signal (e.g., a physical layer signal or a higher layer signal). Or, it may be able to configure the UE to implicitly recognize the information based on a predetermined rule.

According to the present invention, when a usage of a radio resource is dynamically changing, it may be able to configure a valid channel state information reference resource (CSI reference resource) to be restricted to positions (timings) of downlink subframes on UL-DL configuration interlocked with a predefined representative downlink HARQ timeline. Similarly, when a usage of a radio resource is dynamically changing, it may be able to configure a valid channel state information reference resource (CSI reference resource) to be restricted to positions (timings) of downlink subframes on UL-DL configuration interlocked with a predetermined representative uplink HARQ timeline.

In the following description, the UL-DL configuration interlocked with the representative downlink HARQ timeline and/or the UL-DL configuration interlocked with the representative uplink HARQ timeline are respectively referred to as a downlink HARQ time line and/or an uplink HARQ timeline configured to efficiently secure a DL HARQ timeline and/or a UL HARQ timeline when a radio resource usage is dynamically changing. In the following, the UL-DL configuration interlocked with the representative downlink HARQ timeline and the UL-DL configuration interlocked with the representative uplink HARQ timeline can be defined and referred to as DL-reference UL-DL configuration and UL-reference UL-DL configuration, respectively.

For example, the UL-DL configuration interlocked with the representative downlink HARQ timeline (or the representative uplink HARQ timeline) can be defined by a specific UL-DL configuration including a) legacy (SIB) downlink subframes and b) the maximum number of downlink subframes capable of being additionally generated by a dynamic change operation and positions of the downlink subframes (i.e., a sort of union-based operation of a) and b)). Or, the UL-DL configuration interlocked with the representative downlink HARQ timeline (or the representative uplink HARQ timeline) can be defined by a specific UL-DL configuration including a) legacy (SIB) downlink subframes and c) the maximum number of downlink subframes capable of being generated during predetermined specific time duration (e.g., 10 ms or a dynamic change period) and positions of the downlink subframes (i.e., a sort of union-based operation of a) and c)). In particular, if a dynamic change of a radio resource usage is performed by one selected from the group consisting of UL-DL configuration #0, #1 and #2, the representative UL-DL configuration can be defined by the UL-DL configuration #2.

As a different example, the UL-DL configuration interlocked with the representative downlink HARQ timeline (or the representative uplink HARQ timeline) can be defined by a specific UL-DL configuration including a) legacy (SIB) downlink subframes and b) the minimum number of downlink subframes capable of being additionally generated by a dynamic change operation and positions of the downlink subframes (i.e., a sort of intersection-based operation of a) and b)). Or, the UL-DL configuration interlocked with the representative downlink HARQ timeline (or the representative uplink HARQ timeline) can be defined by a specific UL-DL configuration including a) legacy (SIB) downlink subframes and c) the minimum number of downlink subframes capable of being generated during predetermined specific time duration (e.g., 10 ms or a dynamic change period) and positions of the downlink subframes (i.e., a sort of intersection-based operation of a) and c)).

As a further different example, the UL-DL configuration interlocked with the representative uplink HARQ timeline (or the representative downlink HARQ timeline) can be defined by a specific UL-DL configuration including a) legacy (SIB) uplink subframes and b) the maximum number of uplink subframes capable of being additionally generated by a dynamic change operation and positions of the uplink subframes (i.e., a sort of union-based operation of a) and b)). Or, the UL-DL configuration interlocked with the representative uplink HARQ timeline (or the representative uplink HARQ timeline) can be defined by a specific UL-DL configuration including a) legacy (SIB) uplink subframes and c) the maximum number of uplink subframes capable of being generated during predetermined specific time duration (e.g., 10 ms or a dynamic change period) and positions of the downlink subframes (i.e., a sort of union-based operation of a) and c)).

As a further different example, the UL-DL configuration interlocked with the representative uplink HARQ timeline (or the representative downlink HARQ timeline) can be defined by a specific UL-DL configuration including a) legacy (SIB) uplink subframes and b) the minimum number of uplink subframes capable of being additionally generated by a dynamic change operation and positions of the uplink subframes (i.e., a sort of intersection-based operation of a) and b)). Or, the UL-DL configuration interlocked with the representative uplink HARQ timeline (or the representative downlink HARQ timeline) can be defined by a specific UL-DL configuration including a) legacy (SIB) uplink subframes and c) the minimum number of uplink subframes capable of being generated during predetermined specific time duration (e.g., 10 ms or a dynamic change period) and positions of the uplink subframes (i.e., a sort of intersection-based operation of a) and c)).

And, according to the present invention, the representative downlink HARQ timeline and the representative uplink HARQ timeline can be configured to be defined based on an identical (representative) UL-DL configuration.

For example, the representative downlink HARQ timeline and the representative uplink HARQ timeline can be configured to be defined based on an identical (representative) UL-DL configuration, which is deducted based on a common (representative) UL-DL configuration selection method. Or, the representative downlink HARQ timeline and the representative uplink HARQ timeline can be configured to be defined based on (representative) UL-DL configurations independent from each other (e.g., different from each other).

In addition, a base station can inform a UE of whether to apply the aforementioned proposed rules and/or information on the proposed rules through a predetermined signal (e.g., a physical layer signal or a higher layer signal). Or, it may be able to configure the UE to implicitly recognize the information based on a predetermined rule.

A case that a signal type used for (re)configuration of a channel state estimation process (and/or restricted CSI measurement) and a signal type used for dynamic (re)change of a radio resource usage are not matched with each other is explained in the following with reference to FIG. 15.

Assume a case that a signal type used for (re)configuration of a channel state estimation process (and/or restricted CSI measurement) and a signal type used for dynamic (re)change of a radio resource usage are not matched with each other. In this case, it is difficult for channel state information and/or interference estimation information based on a specific channel state estimation process (and/or restricted CSI measurement) to correctly reflect an impact of a radio resource of which a usage is recently changed or a recent impact of external interference.

Figure 15:
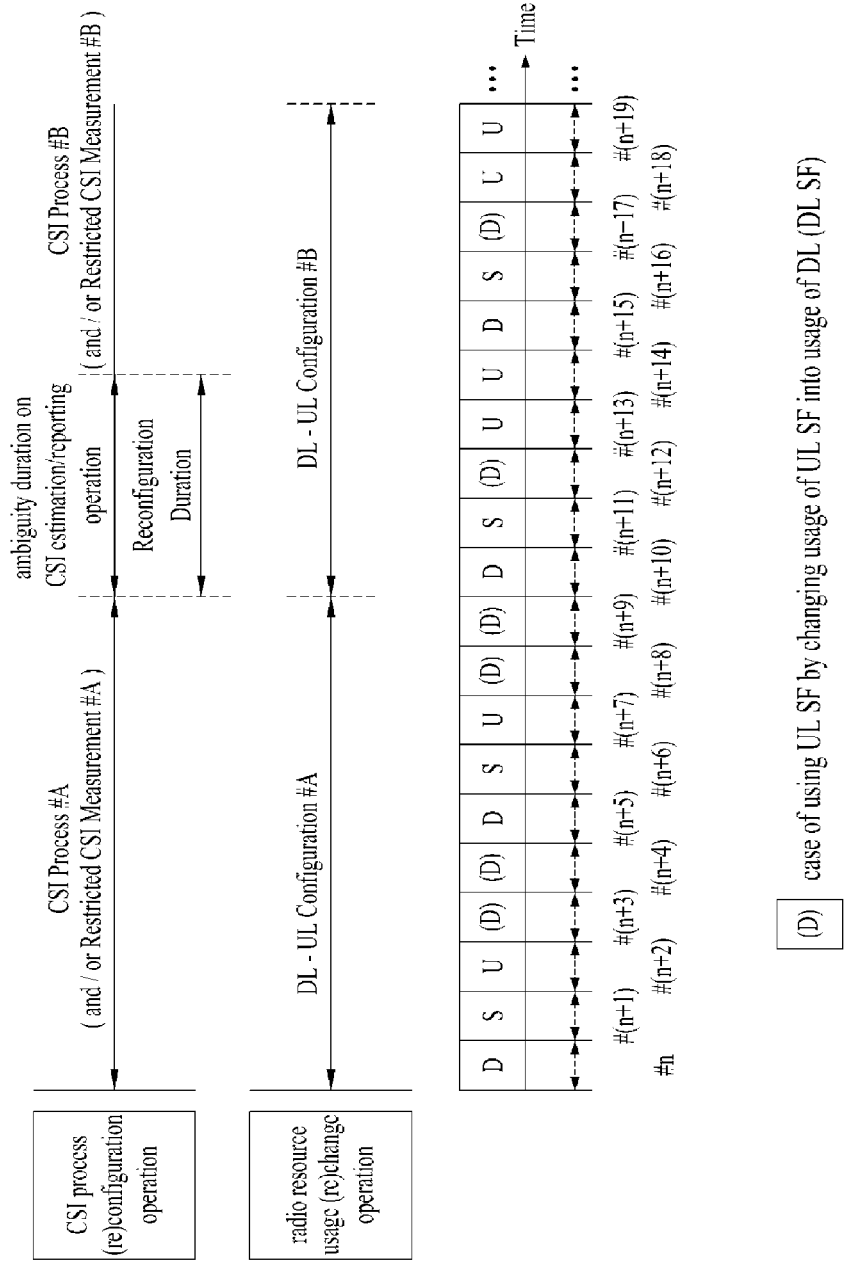
FIG. 15 is a diagram for a case that a signal type for (re)configuring a channel state estimation process (and/or restricted CSI measurement) is different from a signal type for dynamically (re)changing a radio resource usage.

In FIG. 15, assume that an RRC signal is used for the (re)configuration of the specific channel state estimation process (and/or restricted CSI measurement) and an MAC signal (or a physical channel (PHY) signal) is used for the dynamic (re)change of the radio resource usage. And, assume that UL-DL configuration configured through SIB under a TDD system corresponds to UL-DL configuration #0 (i.e., DSUUUDSUUU) and the (re)change of the radio resource usage is performed with a predetermined period (10 ms).

If a usage of a radio resource is changed to DL-UL configuration #B from DL-UL configuration #A using an MAC signal (or a physical channel signal), i) a legacy channel state estimation process #A for the DL-UL configuration #A should be changed to a channel state estimation process #B for the updated DL-UL configuration #B, and/or ii) restricted CSI measurement #A for the DL-UL configuration #A should be changed to restricted CSI measurement #B for the updated DL-UL configuration #B, and/or iii) an interference measurement resource #A for the DL-UL configuration #A should be changed to an interference measurement resource #B for the updated DL-UL configuration #B.

Yet, since time taken for completing RRC signal-based i) channel state estimation process (re)configuration and/or ii) restricted CSI measurement (re)configuration and/or iii) interference measurement resource (re)configuration is relatively longer than time taken for a case of an MAC signal (or a physical channel signal), although the usage of the radio resource is updated into the DL-UL configuration #B, it may be difficult to complete i) a reconfiguration operation of a channel state estimation process and/or ii) a restricted CSI measurement (re)configuration operation and/or iii) an interference measurement resource (re)configuration operation configured to reflect changed interference/channel environment/DL-UL configuration. Hence, in this case, an ambiguous duration occurs on channel state estimation (or interference estimation) and a reporting operation.

Hence, the present invention proposes a method of efficiently solving an ambiguity problem on channel state estimation (or interference estimation) and reporting operation, which occur when a signal type used for i) a channel state estimation process and/or ii) restricted CSI measurement and/or iii) (re)configuration of an interference measurement resource is different from a signal type used for dynamic (re)change of a radio resource usage.

For example, in order to additionally explain i) a case that timing of completing dynamic (re)change of a radio resource usage is not matched with timing of completing (re)configuration of a channel state estimation process and/or ii) a case that timing of completing dynamic (re)change of a radio resource usage is not matched with timing of completing (re)configuration of restricted CSI measurement and/or iii) a case that timing of completing dynamic (re)change of a radio resource usage is not matched with timing of completing (re)configuration of an interference measurement resource, assume that there exist subframe types including a downlink subframe of a fixed usage (hereinafter, F_DL SF), an uplink subframe of a fixed usage (hereinafter, F_UL SF) and a subframe of which a usage is changing (hereinafter, C_SF).

Hence, the C_SF is configured for a DL usage. If i) a channel state estimation process and/or ii) an interference measurement resource and/or iii) restricted CSI measurement are defined to perform a channel/interference estimation operation in the C_SF of the DL usage, a periodic channel state report (periodic CSI report) operation (i.e., in this case, the periodic channel state report is configured to be performed through the F_UL SF) can be performed on the C_SF of the DL usage based on the channel state estimation process, the interference measurement resource and the restricted CSI measurement. In this case, if the C_SF is (re)changed to a usage of UL via an MAC signal (or a physical channel signal) in the middle of performing the periodic channel state report based on i) the channel state estimation process, ii) the interference measurement resource and iii) the restricted CSI measurement configured for the C_SF of the DL usage, the interference measurement resource set to the C_SF is not valid anymore. In this situation, since a (re)configuration operation of an RRC signal-based i) channel state estimation process, and/or ii) interference measurement resource and/or iii) restricted CSI measurement is not completed, it is not clear which action is to be performed for an UL control channel (PUCCH)-based channel state information transmission operation.

According to the present invention, if a) timing of completing dynamic (re)change of a radio resource usage is not matched with b) timing of completing (re)configuration of a channel state estimation process and/or restricted CSI measurement and/or an interference measurement resource due to a signal type different from each other, it is able to configure a UE to transmit channel state information (e.g., CQI, PMI, RI) of a predetermined specific value to a base station.

The base station can inform the UE of the channel state information of the specific value transmitted by the UE through a predetermined signal. For example, CQI of a specific value transmitted by the UE can be defined by a CQI index #0 (i.e., out of range) and RI of a specific value can be defined by 1 and/or PMI of a specific value can be defined by an RI 1-based specific codebook index (e.g., a codebook index corresponding to identity matrix). In particular, if the UE is configured to transmit CSI information of predefined specific values, the base station can implicitly recognize i) timing of completing (re)configuration of a channel state estimation process and/or ii) timing of completing (re)configuration of restricted CSI measurement and/or iii) timing of completing (re)configuration of an interference measurement resource of the UE.

As a different example, CQI information of a specific value and/or RI information of a specific value and/or PMI information of a specific value transmitted by the UE can be defined by i) last values (or most recent values) before a (re)configuration operation of a channel state estimation process is performed and/or ii) last values (or most recent values) before a (re)configuration operation of restricted CSI measurement is performed and/or iii) last values (or most recent values) before a (re)configuration operation of an interference measurement resource is performed. As an additional example, the channel state information of the specific value transmitted by the UE can be configured to be transmitted through a predetermined specific UL resource (e.g., PUCCH/PUSCH) and the base station can inform the UE of relevant information (e.g., UL resource) via a predetermine signal.

Specifically, assume environment that an RRC signal is used for (re)configuration of a specific channel state estimation process and/or restricted CSI measurement and/or an interference measurement resource and an MAC signal (or a physical channel signal) is used for dynamic (re)change of a radio resource usage. Although a radio resource usage is updated under this assumption, if a reconfiguration operation of i) a channel state estimation process and/or ii) restricted CSI measurement and/or iii) an interference measurement resource configured to reflect changed interference/channel environment/DL-UL configuration is not completed, the UE can transmit channel state information (e.g., CQI, PMI, RI) of a predetermined specific value to the base station through a specific UL resource designated in advance according to the present invention.

As an additional embodiment of the present invention, if i) timing of completing dynamic (re)change of a radio resource usage is not matched with b) timing of completing (re)configuration of a channel state estimation process (and/or restricted CSI measurement or an interference measurement resource) due to a signal type different from each other, it may be able to configure a UE to omit a channel state information reporting operation. In this case, the method of omitting the channel state information reporting operation is useful especially for a periodic channel state information reporting (periodic CSI report) operation of the UE.

For example, assume environment that an RRC signal is used for (re)configuration of a specific channel state estimation process and/or restricted CSI measurement and/or an interference measurement resource and an MAC signal (or a physical channel signal) is used for dynamic (re)change of a radio resource usage. Under this assumption, although a radio resource usage is updated, if a reconfiguration operation of a channel state estimation process and/or restricted CSI measurement and/or an interference measurement resource configured to reflect changed interference/channel environment/DL-UL configuration is not completed, the UE can omit the channel state information reporting operation according to the present invention.

As a further different embodiment of the present invention, when a radio resource usage on a specific cell (or a component carrier) is dynamically changing and both a UL control channel (PUCCH) and a UL data channel (PUSCH) are configured to be transmitted at the same time in environment to which carrier aggregation (CA) scheme is applied, if a UL control channel (PUCCH)-based (periodic) channel state reporting operation is omitted due to i) the mismatch between the timing of completing dynamic (re)change of a radio resource usage and the timing of completing (re)configuration of a channel state estimation process and/or ii) the mismatch between the timing of completing dynamic (re)change of a radio resource usage and the timing of completing (re)configuration of restricted CSI measurement and/or iii) the mismatch between the timing of completing dynamic (re)change of a radio resource usage and the timing of completing (re)configuration of an interference measurement resource, it may be able to configure extra power (i.e., power necessary for UL control channel (PUCCH)-based (periodic) channel state reporting) to be used for transmitting UL data channel (PUSCH)-based data and/or UL control information (UCI) of corresponding timing based on a predetermined configuration.

For example, the present invention may be useful especially for transmitting UL data channel (PUSCH)-based trustworthy data and/or UL control information (UCI) when a sum of a) power necessary for UL control channel (PUCCH)-based (periodic) channel state reporting and b) power necessary for transmitting UL data channel (PUSCH)-based data and/or UL control information (UCI) (i.e., a+b) arrives at maximum transmit power (i.e., $P_{MAX}$) of a UE at the timing of omitting UL control channel (PUCCH)-based (periodic) channel state reporting operation. Or, the present invention may be useful especially for transmitting UL data channel (PUSCH)-based trustworthy data and/or UL control information (UCI) when a sum of a) power necessary for UL control channel (PUCCH)-based (periodic) channel state reporting and b) power necessary for transmitting UL data channel (PUSCH)-based data and/or UL control information (UCI) (i.e., a+b) exceeds maximum transmit power of a UE and the sum of the power is calibrated again at the timing of omitting UL control channel (PUCCH)-based (periodic) channel state reporting operation.

The aforementioned power control scheme of the present invention can also be extensively applied to a case that a radio resource usage is dynamically changing on a cell (or a component carrier) and both a UL control channel (PUCCH) and a UL data channel (PUSCH) are configured to be transmitted at the same time in non-CA environment. For example, legacy UL power assignment is sequentially performed according to priority of "UL control channel (PUCCH)-based control information transmission->UL data channel (PUSCH)-based UL control information transmission->UL data channel (PUSCH)-based data transmission" (In this case, A->B indicates that A is configured to be preferentially redistributed compared to B. In particular, the legacy UL power is configured to be preferentially redistributed for UL information (channels) positioned at the front).

Hence, according to the present invention, it may be able to configure the power necessary for the omitted UL control channel (PUCCH)-based (periodic) channel state reporting to be sequentially redistributed based on predetermined priority of "UL data channel (PUSCH)-based UL control information transmission->UL data channel (PUSCH)-based data transmission" In this case, if the power necessary for the UL control channel (PUCCH)-based (periodic) channel state reporting (i.e., extra power) is redistributed according to the predetermined priority, it may be able to independently (e.g., differently) define a redistribution-related weight according to priority.

As a different example, the extra power can be preferentially redistributed to information transmission to which higher priority is set and the extra power can be sequentially provided to information transmission of next priority.

As a further different example, i) if a UE is incapable of transmitting UL control channel (PUCCH) and UL data channel (PUSCH) at the same time or ii) if an operation of transmitting UL control channel (PUCCH) and UL data channel (PUSCH) at the same time is not configured, UL control channel (PUCCH)-based UL control information (UCI), which is transmitted with UL data channel (PUSCH) at the same time, can be transmitted in a manner of being piggy-back to UL data channel (PUSCH). In particular, at the timing that the UL control channel (PUCCH)-based UL control information is transmitted in a manner of being piggy back to the UL data channel (PUSCH), if the UL control information transmitted at the timing is omitted according to the present invention due to the mismatch between timing of completing dynamic (re)change of a radio resource usage and timing of completing (re)configuration of a channel state estimation process (and/or restricted CSI measurement and/or an interference measurement resource), it may be able to configure a resource (e.g., RE or RB) on the UL data channel (PUSCH) to which the UL control information is transmitted to be emptied out using such a method as rate-matching (RM) or puncturing (PC) without performing UL data mapping to the resource.

In this case, it is able to configure a base station and a UE to share information on a position of the resource (e.g., RE or RB), which is emptied out by the RM or PC method, on the UL data channel (PUSCH) with each other. Or, it is able to configure the base station and the UE to implicitly identify the information on the position of the resource. Hence, the base station and the UE may receive/transmit UL data in consideration of the emptied position of the resource (e.g., RE or RB) on the UL data channel (PUSCH). For example, transmit power of the resource (e.g., RE or RB), which is emptied out by the RM or PC method, on the UL data channel (PUSCH) can be set to 0. Moreover, it may be able to configure transmit power of the omitted piggyback UL control information to be redistributed for "UL data channel (PUSCH)-based data information transmission".

As a further different example, at the timing of transmitting UL control information in a manner of being piggyback to UL data channel (PUSCH), if the UL control information transmitted at the corresponding timing is omitted according to the present invention due to the mismatch between timing of completing dynamic (re)change of a radio resource usage and timing of completing (re)configuration of a channel state estimation process (and/or restricted CSI measurement and/or an interference measurement resource), it may be able to configure transmit power of a resource (e.g., RE or RB) on the UL data channel (PUSCH) on which UL control information is transmitted in a manner of being piggyback to be set to 0. In this case, as an example, information on a position of the resource (e.g., RE or RB) of which transmit power is set to 0 on the UL data channel (PUSCH) can be shared in advance between a base station and a UE and the information can be implicitly identified by the base station and the UE. The base station and the UE may receive/transmit UL data in consideration of the resource position on the UL data channel (PUSCH). Moreover, it may be able to configure extra power to be redistributed for "UL data channel (PUSCH)-based data information transmission".

As a further different embodiment, at the timing of transmitting UL control information in a manner of being piggyback to UL data channel, if the UL control information transmitted at the corresponding timing is omitted according to the present invention due to the mismatch between timing of completing dynamic (re)change of a radio resource usage and timing of completing (re)configuration of a channel state estimation process (and/or restricted CSI measurement and/or an interference measurement resource), it may be able to configure UL data information to be transmitted to a resource on the UL data channel to which the UL control information is transmitted in a manner of being piggyback according to a predetermined rule.

In addition, it may be able to configure a base station to inform a UE of information on whether to apply the proposed rules and/or information on the proposed rules through a predefined signal (e.g., a physical layer or a higher layer signal). Or, it may be able to configure the UE to implicitly identify the information based on a predetermined rule.

And, in order to efficiently apply i) an operation of dynamically changing a usage of a radio resource and/or ii) (a plurality of) restricted CSI measurement result reporting operations and/or iii) (a plurality of) channel state estimation process configurations and result reporting operations to other transmission modes rather than a specific transmission mode (e.g., transmission mode 10), it is necessary to additionally define channel state estimation (and/or interference estimation)-related resources/configurations.

For example, although a configuration on a legacy interference measurement resource (IMR) is available in the transmission mode 10 only, it is necessary to configure an interference estimation resource or an interference measurement resource of a type different from a type of the interference measurement resource in the transmission mode 10) in other transmission modes to accurately perform an interference estimation operation (or deduct an interference estimation value) on individual radio resource sets of which an interference characteristic is different from each other, which are generated due to a dynamic change of a radio resource usage according to a base station.

Hence, as an embodiment of the present invention, in case of the transmission mode 10, an interference measurement resource is defined to be used by default. On the contrary, in case of other transmission modes, it may be able to define to optionally use an interference measurement resource (or an interference measurement resource of a type different from a type of an interference measurement resource in the transmission mode 10) according to a predetermined rule. In this case, if a specific reference signal (e.g., CRS) is configured not to be transmitted on a usage changed UL resource, it may be able to configure an operation of dynamically changing a radio resource usage not to be supported in transmission modes (e.g., transmission mode 4 (transmit diversity-based data transmission scheme)) requiring a corresponding reference signal-based data information/control information decoding operation.

As a different example, if a specific reference signal (e.g., DM-RS) is configured to be used on a usage changed UL resource for a decoding operation of data information/control information, it may be able to configure an operation of dynamically changing a radio resource usage to be supported in transmission modes only in which the specific reference signal-based data information/control information decoding operation is available.

In addition, a base station can inform a UE of i) information on whether to apply the embodiments of the present invention and/or ii) information on an operation of dynamically changing a radio resource usage and/or iii) information on an operation of reporting (a plurality of) restricted CSI measurement results and/or iv) information on transmission modes supporting an operation of configuring (a plurality of) channel state estimation processes and reporting a result and/or v) information on whether or not an interference measurement resource is usable (configurable) in specific transmission modes and/or vi) information on whether or not an interference measurement resource of a type different from a type of an interference measurement resource is usable (configurable) in transmission mode 10. Or, it may be able to configure a UE to implicitly identify the information based on a predetermined rule. Or, it may be able to configure the aforementioned information is to be implicitly identified by a UE according to whether or not transmission of a specific reference signal (e.g., CRS) is performed in a UL subframe of which a usage is changed without an additional signal transmitted by a base station.

As an embodiment of the present invention, if timing of completing dynamic (re)change of a MAC/physical channel signal-based radio resource usage is not matched with timing of completing (re)configuration of RRC signal-based UL information transmission due to a signal type different from each other, it may be able to determine i) whether to transmit UL information (re)configured based on an RRC signal and/or ii) whether to omit partial information among UL information (channels) (re)configured based on an RRC signal and/or iii) power redistribution between transmitted uplink information. In other word, if timing of completing dynamic (re)change of a MAC/physical channel signal-based radio resource usage is not matched with timing of completing (re)configuration of RRC signal-based UL information (channel) transmission due to a signal type different from each other, it may be able to determine i) whether to transmit UL channels (re)configured based on an RRC signal and/or ii) whether to omit partial channel among UL channels (re)configured based on an RRC signal and/or iii) power redistribution between transmitted uplink channels. In this case, the UL information or the UL channels (re)configured via the RRC signal can consist of i) periodic/aperiodic SRS (e.g., transmission period configuration/subframe offset configuration/resource configuration) and/or ii) periodic/aperiodic channel state report (periodic/aperiodic CSI report) (e.g., report period configuration/subframe offset configuration/resource configuration) and the like.

The embodiment of the present invention may be useful for a case that the UL information (or channels) (re)configured based on the RRC signal is unable to properly reflect an impact of a radio resource (and/or changed interference/channel environment) (re)changed through MAC/physical channel signal due to a signal type different from each other.

As an embodiment of the present invention, if timing of completing dynamic (re)change of a MAC/physical channel signal-based radio resource usage is not matched with timing of completing (re)configuration of RRC signal-based UL information/channel transmission, it may be able to configure all transmissions of the UL information/channels (re)configured based on the RRC signal to be omitted.

As a different embodiment of the present invention, if timing of completing dynamic (re)change of a MAC/physical channel signal-based radio resource usage is not matched with timing of completing (re)configuration of RRC signal-based UL information/channel transmission, it may be able to configure partial information/channels among the UL information/channels (re)configured based on the RRC signal to be omitted according to a predetermined priority configuration. In this case, as an example, the priority configuration can be defined as "periodic SRS transmission->periodic channel state information (CSI) transmission->aperiodic SRS transmission->aperiodic channel state information (CSI) transmission->UL ACK/NACK information transmission". It may be able to configure UL information/channels positioned at the front to be preferentially omitted (in particular, in case of A->B, it is able to configure A to be preferentially omitted compared to B).

As a further different embodiment of the present invention, if timing of completing dynamic (re)change of a MAC/physical channel signal-based radio resource usage is not matched with timing of completing (re)configuration of RRC signal-based UL information (or channels) transmission, it may be able to configure transmit powers of omitted UL information (or channels) to be redistributed according to a predefined priority configuration. For example, it may be able to configure the transmit powers of the omitted UL information (or channels) to be sequentially redistributed based on priority of "UL control channel (PUCCH)-based UL control information transmission->UL data channel (PUSCH)-based control information transmission->UL data channel (PUSCH)-based data information transmission" (In this case, A->B indicate that A is configured to be preferentially redistributed compared to B. In particular, it is able to configure transmit power to be preferentially redistributed to UL information (channels) positioned at the front).

Moreover, if transmit power (i.e., extra power) of UL information (channels), which are omitted according to a predetermined priority configuration, is redistributed according to priority, a redistribution-related weight per priority can be independently or differently defined. And, it may be able to configure extra power to be preferentially redistributed to transmit information (channel) to which high priority is set and the extra power can be configured to be sequentially redistributed to transmit information (channel) to which next priority is set.

As a further different example, in case of a UE incapable of transmitting UL control channel (PUCCH) and UL data channel (PUSCH) at the same time or a UE to which an operation of transmitting UL control channel (PUCCH) and UL data channel (PUSCH) at the same time is not set, UL control channel (PUCCH)-based UL control information (UCI), which is transmitted with UL data channel (PUSCH) at the same time), can be transmitted in a manner of being piggy-back to UL data channel (PUSCH). At this timing that the UL control channel (PUCCH)-based UL control information is transmitted in a manner of being piggy back to the UL data channel (PUSCH), if the UL control information (channels), which are (re)configured based on RRC signal, transmitted at the timing are omitted according to the present invention due to the mismatch between timing of completing dynamic (re)change of a radio resource usage based on MAC/physical channel signal and timing of completing (re)configuration of UL information (channel) based on RRC signal, it may be able to configure a resource (e.g., RE or RB) on the UL data channel (PUSCH) to which the UL control information (channel) is transmitted to be emptied out using such a method as rate-matching (RM) or puncturing (PC) without performing UL data mapping on the resource.

In this case, a base station and a UE can share information on a position of the resource (e.g., RE or RB), which is emptied out by the RM or PC method, on the UL data channel (PUSCH) with each other. Or, the base station and the UE can implicitly identify the information on the position of the resource. The base station and the UE may receive/transmit UL data in consideration of the emptied position of the resource (e.g., RE or RB) on the UL data channel (PUSCH). As an example, transmit power of the resource (e.g., RE or RB), which is emptied out by the RM or PC method, on the UL data channel (PUSCH) can be set to 0. In this case, it may be able to configure transmit power of the omitted piggyback UL control information/channels to be redistributed for "UL data channel (PUSCH)-based data information transmission".

As a different example, at the time that UL control channel-based UL control information is transmitted in a manner of being piggyback to UL data channel (PUSCH), if the UL control information/(channels), which are (re)configured based on RRC signal, transmitted at the corresponding time are omitted according to the present invention due to the mismatch between timing of completing dynamic (re)change of an MAC/physical channel signal-based radio resource usage and timing of completing (re)configuration of an RRC signal-based UL control information/channel transmission, it may be able to configure transmit power of a resource (e.g., RE or RB) on the UL data channel (PUSCH) on which UL control information is transmitted in a manner of being piggyback to be set to 0. In this case, information on a position of the resource (e.g., RE or RB) of which transmit power is set to 0 on the UL data channel (PUSCH) can be shared in advance between a base station and a UE and the information can be implicitly identified. The base station and the UE may receive/transmit UL data in consideration of the resource position on the UL data channel (PUSCH). As an example, it may be able to configure extra power to be redistributed for "UL data channel (PUSCH)-based data information transmission".

As a different example, at the time that UL control channel-based UL control information is transmitted in a manner of being piggyback to UL data channel (PUSCH), if the UL control information/(channels), which are (re)configured based on RRC signal, transmitted at the corresponding time are omitted according to the present invention due to the mismatch between timing of completing dynamic (re)change of an MAC/physical channel signal-based radio resource usage and timing of completing (re)configuration of an RRC signal-based UL control information/channel transmission, it may be able to configure UL data information to be transmitted to a resource on the UL data channel (PUSCH) on which UL control information is transmitted in a manner of being piggyback according to a predefined configuration.

And, the proposed schemes can be extensively applied to all cases that a radio resource usage on a single cell (or component carrier) is dynamically changing in CA environment or non-CA environment and both UL control channel (PUCCH) and UL data channel (PUSCH) are configured to be transmitted at the same time. In addition, a base station can inform a UE of information on whether to apply the configurations proposed by the present invention and information on the configurations proposed by the present invention through a predefined signal (e.g., a physical layer or a higher layer signal). Or, it may be able to configure the UE to implicitly identify the information based on a predetermined rule.

Figure 16:
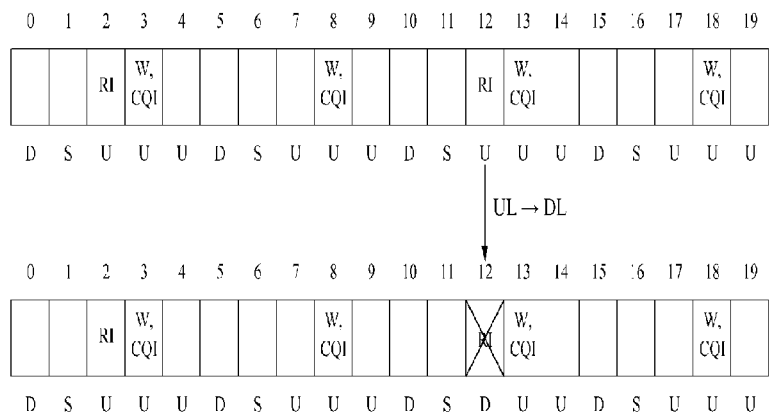
FIGS. 16 to 17 are diagrams for an operation of dynamically changing a resource for a channel state information (CSI) report according to an embodiment of the present invention.

Although the embodiments of the present invention correspond to a scheme of solving ambiguity due to a mismatch between timings of completing signaling for an interference measurement resource and/or a signal measurement resource, as shown in FIG. 16, the schemes can also be used for an operation of dynamically changing a resource for channel state information (CSI) reporting.

In FIG. 16, assume that C_SF (i.e., a subframe (set) capable of changing a usage) is defined as a UL usage on SIB and RI information reporting is performed in the subframe. In this case, if the C_SF is changed to a DL usage due to a necessity (e.g., DL load increase) of a network, it is necessary to clearly define a method of transmitting or reporting RI information to be reported in the subframe and a method of processing PMI information/CQI information which is determined and reported based on the RI information. In FIG. 16, assume that the RI information has an interval (or periodicity) of 10 subframes (i.e., 10 ms) on the basis of UL subframe, W (i.e., PMI information)/CQI information has an interval or periodicity of 5 subframes (i.e., 5 ms) and a subframe in which the W/CQI information and the RI information are reported has an offset of −1. In the following description of the present invention, the W may indicate at least one of a wideband PMI and a subband PMI and the CQI information may indicate at least one of a wideband CQI and a subband CQI. In FIG. 16, if a usage of a subframe #12 is changed to a DL subframe from a UL subframe, it is able to see that an additional configuration for processing the RI information, which is transmitted in the subframe #12, is required.

Figure 17:
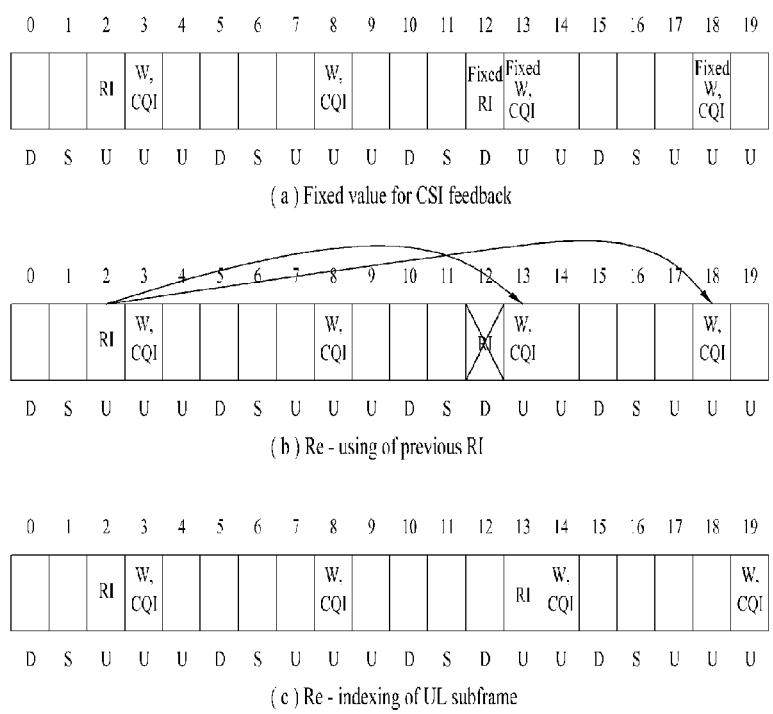

As shown in FIG. 16, if a usage of a resource (or subframe) for reporting channel state information (CSI) is changed, the contents of the proposed invention can be (re)applied as follows. FIG. 17 shows embodiments of the aforementioned method. In this case, the contents described in the following are just an example and all of the previously proposed contents of the present invention can be extensively applied.

Technical ideas of the present invention described in the following are useful especially for a case that a subframe of which a usage is changed to DL from UL corresponds to a subframe which is scheduled (configured) to report RI information. As an example, if a usage of an UL subframe configured to report PMI information/CQI information is changed to a DL usage, it may omit the PMI information report/CQI information report. In some cases (e.g., 8 Tx), information such as W1 (long-term PMI), PTI and the like can be encoded together in a subframe in which RI information is reported. In this case, it may belong to an embodiment described in the following with reference to FIG. 17 and FIG. 18.

As shown in FIG. 17 (a), the RI information is assumed as a predetermined fixed value (e.g., 1) and PMI information/CQI information based on the RI information is also reported by a fixed value. In this case, this operation can be performed as an operation of omitting a channel state information report of PMI information/CQI information reporting section (or a section until a usage is changed to UL again) based on a fixed RI value. If a DL subframe is changed to an UL subframe again, a channel state information reporting can be performed using a legacy method from timing of firstly reporting RI information from the timing of changing the subframe or timing of reporting RI information corresponding to a firstly existing channel state information reference resource (CSI reference resource).

As shown in FIG. 17 (b), PMI information/CQI information can be calculated and reported based on RI information of which a usage is not changed. If a DL subframe is changed to an UL subframe again, a channel state information reporting can be performed using a legacy method from timing of firstly reporting RI information from the timing of changing the subframe or timing of reporting RI information corresponding to a firstly existing channel state information reference resource (CSI reference resource).

As shown in FIG. 17 (c), it may be able to calculate timing of reporting channel state information in a manner of re-indexing UL subframe index and using a practically available UL subframe only among re-indexed UL subframes. For example, timing of reporting RI information can be moved to a first available subframe after timing on which original RI information is reported. Moreover, it may be able to apply an offset such as RI information and PMI information/CQI information based on an available subframe as a start point.

As shown in FIG. 18, it may be able to calculate timing of reporting channel state information such as RI information, PMI information, CQI information and the like by re-indexing available UL subframes only. For example, timing of reporting channel state information such as RI information and PMI information/CQI information can be readjusted by re-indexing an index of a subframe of which a usage is changed to a DL subframe from an UL subframe on a first available UL subframe. If the DL subframe is changed to the UL subframe again, the timing of reporting channel state information can be readjusted by performing re-indexing again. In this case, it may be able to configure the re-indexing operation to be sequentially performed in a manner of skipping a subframe of which a usage is changed (e.g., a subframe of which a usage is changed to a DL usage from an UL usage) (i.e., FIG. 18 (a)) or it may be able to configure the re-indexing to be performed again from a subframe of which a usage is changed (e.g., a subframe of which a usage is changed to a DL usage from an UL usage) (i.e., FIG. 18 (b)).

In addition, if a DL subframe used for a usage of measuring a signal and/or a usage of measuring interference is changed to an UL subframe and a UE measures a signal and/or interference by averaging a predetermined certain section (e.g., average time domain window), the present invention proposes to exclude the subframe of which a usage is changed from the averaged section (e.g., average time domain window) and calculate and report channel state information (CSI) using the remaining available signal/interference measurement resources belonging to the section (i.e., average time domain window). In this case, as an example, when a signal and/or interference is measured using signal/interference measurement resources belonging to a single (DL) subframe only, the aforementioned scheme can be interpreted as a report (related to the signal and/or interference measurement) is to be omitted or a predetermined fixed value is to be reported.

If a usage of a subframe including an interference measurement resource (IMR) changes, an operation related to channel state information (CSI) reporting is additionally proposed in the present invention. In particular, in case of a periodic channel state information report, if a usage of a specific subframe is changed (e.g., a usage is changed to a UL usage from a DL usage) and an interference measurement resource is included (configured) in the specific subframe, i) a channel state information report using an interference amount (or interference value), which is calculated from the interference measurement resource, can be omitted, ii) the channel state information report is fixed by a predetermined specific value, or iii) the channel state information report can be performed based on a different available interference measurement resource. In this case, as an example, if the channel state information report is omitted or fixed by a specific value, it may be able to omit at least one of [RI, W1 (long-term PMI), PTI] and [CQI, PMI], which are deducted based on a usage-changed subframe reported at timings different from each other (or UL subframe) or an interference measurement resource in the usage-changed subframe in the periodic channel state information report. For example, it may be able to configure RI information to be omitted or fixed by a specific value and it may also be able to configure CQI information and PMI information to be omitted or reported by a specific value.

In addition, if the channel state information reporting is performed using a different interference measurement resource, it may be able to select an interference measurement resource. In this case, it may be preferable to include the interference measurement resource in a corresponding channel state estimation process (CSI process). As an example, it may be able to measure interference using a subframe, which is closest to a subframe of which a usage is changed and includes a practically available interference measurement resource among subframes appearing before the subframe of which a usage is changed, and report channel state information based on the subframe. In this case, the subframe in which the interference measurement is performed may correspond to a practically available subframe appearing before (predetermined) specific time (e.g., 4 ms) from the timing of reporting channel state information. In this case, if the subframe including the practically available interference measurement resource is far from the subframe of which the usage is changed in time manner, there is a demerit in that it is unable to guarantee an accurate channel status (and/or interference status).

Hence, it may be able to configure a time window capable of assuming that a channel status and/or interference status is similar in time domain, measure interference from the subframe of which the usage is changed using a subframe belonging to the time window and including a practically available interference measurement resource and reflect the measured interference to the channel state information report. In this case, if a subframe available for a usage of measuring interference does not exist or a valid interference measurement resource does not exist in the time window, as mentioned in the foregoing description, it may be able to perform an operation of omitting a channel state report or an operation of reporting a channel state fixed by a specific value.

In case of reporting aperiodic channel state information, it may also be able to apply the aforementioned periodic channel state information reporting scheme. Similarly, in case of omitting a channel state information report, power to be used for the channel state information report is set to 0 and corresponding extra power can be used for transmitting UL data channel (PUSCH). Or, a resource to be used for reporting a (periodic/aperiodic) channel state on a UL data channel can be (re)used for transmitting UL data.

The present invention additionally proposes a method of determining validity of a resource for performing (interference/signal) measurement.

As an example, a base station can inform a UE of at least one selected from the group consisting of CSI-RS configuration information for a channel state information (CSI) report of the UE, IMR configuration information, channel state estimation process (CSI process) information, and restricted CSI measurement information) using an RRC signal. On the contrary, a radio resource usage can be dynamically changed based on a predetermined MAC signal or a physical channel signal. This may indicate that a plurality of subframe usage changes occur during a period between RRC signaling of single (interference/signal) measurement-related information (e.g., measurement configuration information) and (re)configuration of the measurement-related information. In particular, a usage of a subframe, which is designated as an interference/signal measurement resource, may change by RRC signaling and it may cause confusion in channel state information reporting.

Hence, the present invention proposes the following. Having received a MAC signal (or a physical channel signal) for changing a subframe usage, a UE assumes that the signal is actually applied after the predetermined number of subframes from a subframe in which the MAC signal is received and the UE is able to determine validity of an interference/signal measurement resource based on the signal. For example, if a signal for changing a subframe usage is received in an SF #n, the UE assumes that the signal is actually applied in an SF # (n+8)) and determines validity of an interference/signal measurement resource based on the signal position.

In this case, as an example, an interference/signal measurement resource (or a measurement resource) existing between the subframe in which the signal for changing the subframe usage is received and the subframe to which the signal is actually applied (i.e., referred to as "transient period") (e.g., (interference/signal) measurement can be performed on a specific resource (e.g., CSI-RS, IMR) in a corresponding subframe) can be assumed as follows. In particular, in the following description, for clarity, assume that the 'transient period' corresponds to a period ranging from timing of receiving information (e.g., a message) for changing/re-changing a subframe usage to timing of actually applying the information (e.g., a message) for changing/re-changing a subframe usage. In the following, for clarity, the 'transient period' is assumed as a period ranging from an SF #n to an SF # (n+7). In particular, if a signal (e.g., MAC signal or physical channel signal) for changing a subframe usage is received in the SF #n, it is assumed as the signal (or content of the signal) is actually applied from an SF # (n+8).

Case of Changing a DL Subframe to an UL Subframe
   If an interference/signal measurement resource for a specific channel state information report exists in a 'transient period' or a period prior to the 'transient period', the channel state information report assumes that an interference/signal measurement resource is valid and may be able to report channel state information deducted from the interference/signal measurement resource.
   If an interference/signal measurement resource for a specific channel state information report exists after a 'transient period' and a usage of a subframe including the interference/signal measurement resource is changed to UL from DL, the interference/signal measurement resource is assumed as invalid and the channel state information report can be omitted or the channel state information report can be performed based on a predefined specific value (e.g., a predetermined value or channel state information calculated by an interference/signal measurement value deducted from a most recent valid (interference/signal) measurement resource.

Case of Changing an UL Subframe to a DL Subframe
   In general, if an UL subframe is changed to a DL subframe, since there is no ambiguity for an interference/signal measurement resource, special assumption is not necessary. Yet, if the UL subframe (i.e., a subframe of which a usage is changed to DL from UL) is designated as a channel state information report timing instead of an interference/signal measurement usage, similar to the aforementioned case (i.e., a case of changing a DL subframe to a UL subframe), the channel state information report is omitted after the 'transient period' and the channel state information report can be performed during the 'transient period'.
   On the contrary, if a subframe usage is frequently changed by a MAC signal (or a physical channel signal) in a state that RRC signaling for notifying an interference/signal measurement resource (and/or configuration information for a channel state information report) is not (re)configured, a usage of a subframe including the interference/signal measurement resource may change to an UL subframe (i.e., first transient period) and may change to a DL subframe again (i.e., second transient period). In this case, as an example, if the usage of the subframe including the interference/signal measurement resource changes, it is able to determine whether or not the subframe is valid for a usage of interference/signal measurement according to a (time) domain (or a predetermined rule).

Figure 19:
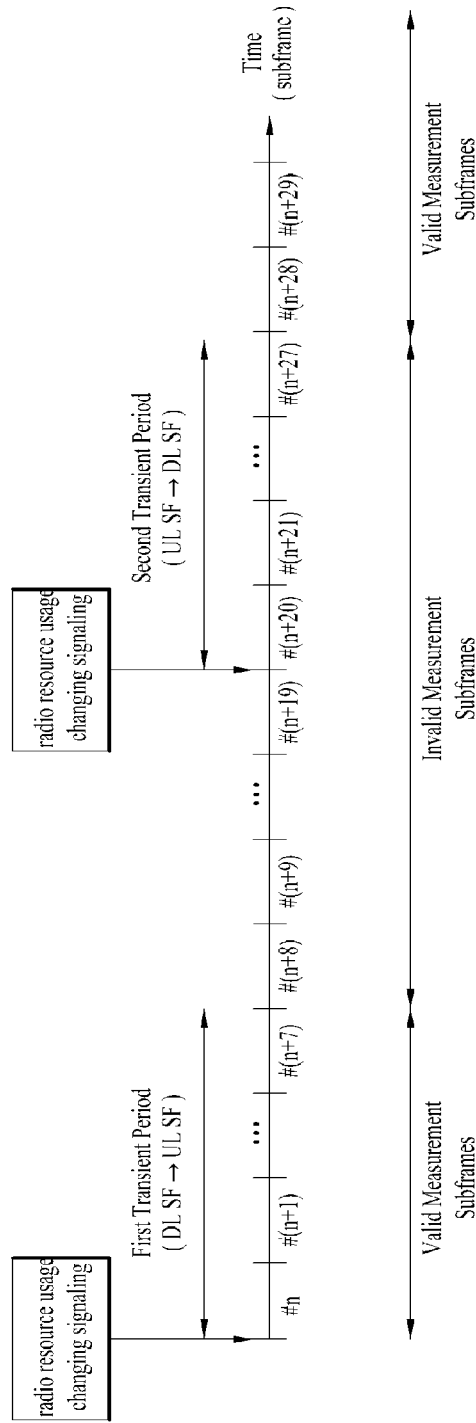
FIG. 19 is a diagram for an embodiment of determining validity of a resource for measuring interference according to the present invention.

FIG. 19 shows an embodiment according to the present invention. In this case, FIG. 19 shows valid timing of an interference/signal measurement resource included in a specific subframe when a usage of the subframe is changed. In FIG. 19, assume that radio resource usage change signaling is transmitted and received based on a predetermined periodicity (i.e., 20 ms). In FIG. 19, an invalid interference/signal measurement subframe corresponds to a subframe incapable of being used as an (interference/signal) measurement usage when an interference/signal measurement resource in the subframe is configured by RRC signaling and a usage change (e.g., DL to UL) of the subframe is indicated by a MAC signal (or a physical channel signal).

In this case, in FIG. 19, although a subframe belongs to an invalid interference/signal measurement subframe domain, if a usage of the subframe is not changed to UL from DL, the subframe can be used for an interference/signal measurement usage. As an example, when a subframe is configured as a DL usage by SIB and a subframe including an interference/signal measurement resource is configured as an interference/signal measurement usage by RRC signaling, whether or not the subframe is usable for the interference/signal measurement usage can be determined by a MAC signal/physical channel signal for changing the usage of the subframe into UL from DL and subframe timing to which the MAC signal/physical channel signal) is (actually) applied.

When a UE performs channel state information (CSI) reporting in an SF #n, if a first interference/signal measurement resource (or a channel state information reference resource (CSI reference resource)) including an SF # (n−k) (e.g., k=4) existing before the SF #n is not valid (e.g., a usage is changed to UL from DL), interference/signal measurement may not be performed on the subframe. In this case, for example, it is able to omit a channel state information report, which is deducted by an invalid interference/signal measurement resource (or a channel state information reference resource). Or, it may transmit one of channel state information calculated by a predefined specific value or an interference/signal measurement value deducted from a most recent valid (interference/signal) measurement resource and (valid) channel state information reported at most recent timing (or previous timing).

The aforementioned embodiments of the present invention determine whether or not an interference/signal measurement resource for reporting specific channel state information is valid for an interference/signal measurement usage under environment in which a usage change of a subframe is indicated by a MAC signal or a physical channel signal. Hence, the embodiments of the present invention can be (re)applied to each of channel state information reports (e.g., RI, CQI, PMI, (W1 (long-term PMI), W2 (short-term PMI)), and the like) for the interference/signal measurement resource. And, if an interference/signal measurement resource is not valid, it may be able to configure a channel state information report corresponding to the interference/signal measurement resource to be omitted without performing interference/signal measurement. Or, it may be able to configure to transmit channel state information, which is calculated by a predetermined specific value or an interference/signal measurement value deducted from or a most recent valid (interference/signal) measurement resource, or (valid) channel state information reported at most recent timing (or previous timing).

In the aforementioned embodiments of the present invention, when an interference amount is deducted by averaging interference measurement resources (IMRs) on a predefined prescribed section (interference average time domain window), it may be able to configure an interference measurement resource related to a channel state information (CSI) report (and/or a channel state estimation process (CSI process)) to be determined as invalid only when usages of all (DL) subframes including an interference measurement resource are changed to UL usage during the section in which the interference averaging operation is performed. For example, it may be determined as not only the interference measurement resource but also the channel state report (and/or the channel state estimation process) is invalid. And, this embodiment of the present invention can be extensively applied to a situation that usages of all (DL) subframes including a resource of a signal measurement usage are changed to UL usages when a signal measurement value is deducted using a resource (e.g., a specific reference signal (e.g., CRS, CSI-RS) on a DL subframe) of a signal measurement usage within a predefined prescribed section (time domain window) or when a signal measurement value is deducted by averaging resources of a signal measurement usage during the predefined prescribed section (signal average time domain window).

According to the present invention, it may be able to configure a valid channel state information reference resource (CSI reference resource) to be differently determined according to a type of a channel state information report. For example, in case of a periodic channel state information report, it may be able to configure a valid channel state information reference resource to be defined or restricted to DL subframes on SIB information or DL subframes on a UL-DL configuration interlocked with a representative DL HARQ timeline (or, a representative UL HARQ timeline).

In particular, in case of the periodic channel state information report, DL subframes on a UL-DL configuration (e.g., a UL-DL configuration on SIB, a UL-DL configuration interlocked with a representative UL-DL (or, a representative UL HARQ timeline) regarded as relatively (semi) static or DL subframes on a DL HARQ timeline interlocked with the UL-DL configuration can be considered as valid channel state information reference resources. Similarly, in case of the periodic channel state information report, DL subframes on a UL-DL configuration regarded as not being changed for relatively long time (long-term)) or DL subframes on a DL HARQ timeline interlocked with the UL-DL configuration can be considered as valid channel state information reference resources.

In this case, as an example, if the present invention is applied, the periodic channel state information report can be configured mainly for a channel state information report on a (semi) static subframe (or a subframe of which a usage is not changed). And, positions of valid channel state information reference resources for the periodic channel state information report may not be impacted by a dynamic change operation of a radio resource usage or may be independent from the dynamic change operation of a radio resource usage.

And, if the present invention is applied for the periodic channel state information report, it may be helpful for implementing a UE or maintaining consistency of a channel state information report. In this case, as an example, if RI information related to periodic channel state information and PMI/CQI information are configured to be reported at timings different from each other, an RI information-related valid channel state information reference resource is designated as a DL subframe of a (semi) static usage (or a DL subframe of which a usage is not changing) and a PMI/CQI information-related valid channel state information reference resource is designated as a DL subframe of which a usage is changing (e.g., C_SF or a flexible subframe). By doing so, it is difficult to maintain the consistency of the periodic channel state information report. The present proposed scheme can solve the aforementioned problem.

And, in case of the periodic channel state information report, it may be able to configure a valid channel state information reference resource to be defined by or restricted to subframes currently configured as a DL usage among DL subframes on SIB information or subframes currently configured as a DL usage among DL subframes on a UL-DL configuration interlocked with a representative DL HARQ timeline.

As a different example, in case of an aperiodic channel state information report, it may be able to configure a valid channel state information reference resource to be defined by or restricted to DL subframes on a dynamic change message (reconfiguration message) of a radio resource usage. In particular, if a subframe of which a usage is changing (e.g., C_SF or a flexible subframe) is (re)configured for a DL usage by the dynamic change message of a radio resource usage, the subframe can be regarded as a valid channel state information reference resource.

As a further different example, it may be able to configure a UL-DL configuration for a DL subframe in which at least one of a valid channel state information reference resource (CSI reference resource) and a valid interference measurement resource (IMR)) is defined to be independently (differently) designated according to i) a channel state estimation process (CSI process) and/or ii) a restricted CSI measurement (or resource-specific CSI measurement)-related subframe set and/or iii) a type of a channel state information report (e.g., periodic channel state information report and aperiodic channel state information report).

In environment to which a carrier aggregation scheme is applied, it may be able to configure i) configuration of the number of CSI processes and/or ii) restricted CSI measurement (or resource-specific CSI measurement)-related subframe set configuration information (e.g., positions of subframes included in a specific subframe set) and/or iii) interference measurement (IMR) configuration information of an Scell (or a scheduled cell) (to which a dynamic change mode of a radio resource usage is set) to be assumed as being identical to configuration information of a PCell (or a scheduling cell) (to which a dynamic change mode of a radio resource usage is set).

For example, if the aforementioned embodiment is applied, a base station informs a UE of i) configuration of the number of CSI processes and/or ii) restricted CSI measurement (or resource-specific CSI measurement)-related subframe set configuration information (e.g., positions of subframes included in a specific subframe set) and/or iii) interference measurement (IMR) configuration information of a PCell (or a scheduling cell) (to which a dynamic change mode of a radio resource usage is set) only via a predetermined signal (e.g., RRC signal). Having received the information on the PCell (scheduling cell) (to which a dynamic change mode of a radio resource usage is set), the UE can identically apply the information to the Scell (scheduled cell) (to which a dynamic change mode of a radio resource usage is set).

In environment to which a carrier aggregation scheme is applied, it may be able to configure subframe-set dependent uplink power control-related uplink subframe set configuration information (e.g., positions of UL subframes included in a specific UL subframe set) of an Scell (or a scheduled cell) (to which a dynamic change mode of a radio resource usage is set) to be assumed as being identical to configuration information of a PCell (or a scheduling cell) (to which a dynamic change mode of a radio resource usage is set). For example, a base station informs a UE of subframe-set dependent uplink power control-related uplink subframe set configuration information (e.g., positions of UL subframes included in a specific UL subframe set) of a PCell (or a scheduling cell) (to which a dynamic change mode of a radio resource usage is set) only via a predetermined signal (e.g., RRC signal). Having received the information on the PCell (scheduling cell) (to which a dynamic change mode of a radio resource usage is set), the UE can identically apply the information to the SCell (scheduled cell) (to which a dynamic change mode of a radio resource usage is set).

And, it may be able to configure UEs in an idle mode to restrictively perform i) an operation of measuring RRM/RLM/CSI and/or ii) an operation of receiving specific cell-related usage change information and/or iii) an operation of receiving a usage change indicator and/or iv) an operation of receiving a random access-related message only in pre-defined specific DL subframes (e.g., DL subframe set (e.g., SF #0, #1, #5, and #6) of which a usage is not changed by transmitting PSS/SSS/PBCH/PAGING/SIB etc.).

And, it may be able to configure UEs in an idle mode to perform i) an operation of measuring RRM/RLM/CSI and/or ii) an operation of receiving specific cell-related usage change information and/or iii) an operation of receiving a usage change indicator and/or iv) an operation of transmitting/receiving a random access-related message based on a UL-DL configuration on SIB.

And, although a UE in an idle mode enters an RRC connected mode of a specific cell, if the UE does not (independently) receive usage change information or a usage change indicator from the cell, it may be able to configure the UE to restrictively perform an operation of monitoring control information ((E)PDCCH) (blind decoding) or an operation of receiving data (PDSCH) in i) predefined specific DL subframes (e.g., DL subframe set of which a usage is not changed by transmitting PSS/SSS/PBCH/PAGING/SIB (e.g., SF #0, #1, #5, and #6)), ii) DL subframes on SIB, or iii) DL subframes on a SIB information-based UL-DL configuration only. In this case, if the present invention is applied, it may be able to configure a base station and a UE to assume a predefined DL/UL HARQ timeline or an SIB information-based DL/UL HARQ timeline.

It is able to configure the aforementioned embodiments of the present invention to be restrictively applied only when a dynamic change mode of a radio resource usage is configured. And, the aforementioned embodiments of the present invention can be extensively applied to a case that radio resource usage change information is configured to be transmitted not only through a MAC signal or a physical channel signal but also through a predefined system information transport channel (e.g., SIB, PBCH (MIB), PAGING).

Since the examples of the aforementioned proposed scheme of the present invention are able to be included as one of methods of implementing the present invention, it is apparent that the examples are capable of being regarded as a sort of proposed schemes. Each of the aforementioned proposed schemes can be independently implemented and can also be implemented in a manner of being combined (aggregated) with each other.

It may be able to configure the aforementioned embodiments of the present invention to be restrictively applied only when i) the predefined number of channel state estimation processes is configured and/or ii) restricted CSI measurement (or resource-specific CSI measurement) is configured and/or iii) a specific channel state information report type (e.g., periodic channel state information report, aperiodic channel state information report) is configured and/or iv) a specific transmission mode (TM) is configured and/or v) a specific UL-DL configuration is configured.

Method of Configuring Interference Measurement Resource (IMR)

In the following, the present invention proposes a method of efficiently configuring an IMR (interference measurement resource) in case that a usage of a radio resource is dynamically changing according to a load status of a system.

A method of configuring an interference measurement resource according to the present invention is explained in a manner of assuming a case such as the aforementioned FIG. 9. In particular, as mentioned in the foregoing description, an embodiment shows a case that a specific cell changes and uses a part of legacy uplink resources (i.e., UL SF) for a purpose of downlink communication according to the increase of an amount of downlink load of a system under TDD system environment. In particular, assume that UL-DL configuration configured through SIB corresponds to UL-DL #1 (i.e., DSUUDDSUUD) and the legacy UL-DL configuration (i.e., UL-DL #1) has changed to UL-DL #2 (i.e., DSUDDDSUDD) by a usage change indicator (reconfiguration message).

In this case, the usage change indicator can be transmitted through at least one selected from the group consisting of i) PDCCH (physical downlink control channel), ii) EPDCCH (enhanced PDCCH) transmitted on legacy PDSCH (physical downlink shared channel) region, iii) PBCH (physical broadcast channel (e.g., MIB), iv) a higher layer signal (e.g., RRC, MAC) and v) SIB (system information block). In addition, the usage change indicator can be defined by such a form as i) a UE-specific signal, ii) a cell-specific signal, or iii) a UE group-specific signal and the like. And, the usage change indicator can be transmitted through a UE-specific search space (USS) and/or a common search space (CSS).

(Legacy) radio resources can be classified into two types due to a dynamic change of a radio resource usage. For example, the (legacy) radio resources can be classified into a resource set (i.e., static resources) used for a static or a fixed usage and a resource set (i.e., flexible resources) of which a usage is dynamically changing.

For example, a resource set used for a usage identical to a usage of UL-DL configuration on SIB (or a resource set continuously used for an identical usage) is defined as a static resource set (e.g., in FIG. 9, SF #n, SF #(n+1), SF #(n+2), SF #(n+4), SF #(n+5), SF #(n+6), SF #(n+7), SF #(n+9)) and a resource set used for a usage different from a usage of UL-DL configuration on SIB (or a resource set possibly used for a different usage) can be defined as a flexible resource set (e.g., in FIG. 9, SF #(n+3), SF # (n+8)).

As a different example, a resource set used for a usage identical to a usage of UL-DL configuration, which is configured at previous usage change timing (e.g., a usage change scheme based on a predetermined usage change period), or a resource set continuously used for an identical usage is defined as a static resource set and a resource set used for a usage different from a usage of UL-DL configuration, which is configured at previous usage change timing (or a resource set possibly used for a different usage), is defined as a flexible resource set.

As a further different example, a resource set used for a usage identical to a usage of UL-DL configuration of a predetermined reference DL HARQ timeline (or a reference UL HARQ timeline) or a resource set continuously used for an identical usage is defined as a static resource set. A resource set used for a usage different from a usage of UL-DL configuration of a reference DL HARQ timeline (or a reference UL HARQ timeline) or a resource set possibly used for a different usage is defined as a flexible resource set.

In this case, a reference DL/UL HARQ timeline (i.e., HARQ timeline configured to stably maintain HARQ timeline irrespective of whether or not a UL-DL configuration is (re)changed) can be defined by one selected from the group consisting of i) a DL/UL HARQ timeline of a UL-DL configuration including a union of DL subframes of reconfigurable UL-DL configuration candidates/a union of UL subframes ii) a DL/UL HARQ timeline of a UL-DL configuration including a union of DL subframes of reconfigurable UL-DL configuration candidates/an intersection of UL subframes, iii) a DL/UL HARQ timeline of a UL-DL configuration including an intersection of DL subframes of reconfigurable UL-DL configuration candidates/a union of UL subframes and iv) a DL/UL HARQ timeline of a UL-DL configuration including an intersection of DL subframes of reconfigurable UL-DL configuration candidates/an intersection of UL subframes.

Figure 20:
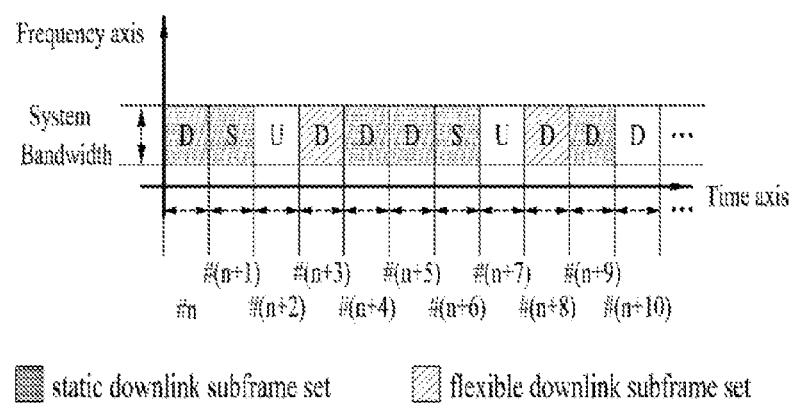
FIG. 20 is a diagram for a case of dividing legacy DL subframes into a static DL subframe set and a flexible DL subframe set under a situation of FIG. 9.

FIG. 20 shows a case of dividing legacy DL subframes into a static DL subframe set and a flexible DL subframe set in a situation identical to a situation of FIG. 9.

Moreover, an interference measurement resource is additionally explained in detail by assuming the situation mentioned earlier in FIG. 10. Among interference shown in FIG. 10, although all configurations on SIB correspond to UL communication direction, interference averaging operation can be performed on interference (i.e., interference type #B) between resources of which a current usage corresponds to DL communication direction together with interference between resources of which communication direction is different from each other. For example, in terms of a cell #A of FIG. 10, interference received on a DL resource can be classified into interference on a static DL subframe set (i.e., SF #n, SF #(n+1), SF #(n+5), SF #(n+6)) and interference on a flexible DL subframe set (i.e., SF #(n+3), SF #(n+4), SF #(n+8), SF #(n+9)).

When a usage of a legacy radio resource changes according to a load state of a system, if channel state (CSI) estimation or interference estimation and reporting are performed without considering an interference characteristic different from each other according to a DL subframe or a subframe set, overall communication performance of a network may be degraded due to incorrect channel state information.

Hence, in the following, a method of efficiently allocating an interference measurement resource (IMR) according to a DL subframe set of which an interference characteristic is different from each other is explained.

First of all, a legacy interference measurement resource (CSI-IM resource configuration(s)) of a UE is explained before a method of configuring an interference measurement resource according to the present invention is explained in detail. For reference, regarding detail contents for the legacy interference measurement resource, it may refer to 7.2.6 paragraph "Channel-State Information—Interference Measurement (CSI-IM) Resource definition" and 7.2.7 paragraph "Zero Power CSI-RS Resource definition" of 3GPP TS 36.213 corresponding to LTE/LTE-A standard.

For a serving cell and UE configured in transmission mode 10, the UE can be configured with one or more CSI-IM resource configuration(s). The following parameters are configured via higher layer signaling for each CSI-IM resource configuration.

Zero-power CSI RS Configuration
Zero-power CSI RS subframe configuration $I_{CSI-RS}$ It may refer to 36.211 for a CSI-RS configuration (i.e., $I_{CSI-RS}$)

In this case, a UE is not expected to receive CSI-IM resource configuration(s) that are not all completely overlapping with one zero-power CSI-RS resource configuration which can be configured for the UE. A UE is not expected to receive a CSI-IM resource configuration that is not completely overlapping with one of the zero-power CSI-RS resource configurations defined in Section 7.2.7 of 3GPP TS 36.213. A UE should not expect the configuration of CSI-IM resource and PMCH in the same subframe of a serving cell.

In the following, Zero-Power CSI-RS Resource is explained.

For a serving cell and UE configured in transmission mode 1-9, the UE can be configured with one zero-power CSI-RS resource configuration. For a serving cell and UE configured in transmission mode 10, the UE can be configured with one or more zero-power CSI-RS resource configuration(s). The following parameters are configured via higher layer signaling for each zero-power CSI-RS resource configuration.

Zero-power CSI RS Configuration list (16-bit bitmap Zero-Power CSI-RS configuration)
Zero-power CSI RS subframe configuration $I_{CSI-RS}$ (Zero-Power CSI-RS configuration $I_{CSI-RS}$). It may refer to 36.211 for a CSI-RS configuration (i.e., $I_{CSI-RS}$).

In this case, a UE should not expect the configuration of zero-power CSI-RS and PMCH in the same subframe of a serving cell. For frame structure type 1, the UE is not expected to receive the 16-bit bitmap ZeroPowerCSI-RS with any one of the 6 LSB bits set to 1 for the normal CP case, or with any one of the 8 LSB bits set to 1 for the extended CP case. For frame structure type 2 and 4 CRS ports, the UE is not expected to receive the 16-bit bitmap ZeroPowerCSI-RS with any one of the 6 LSB bits set to 1 for the normal CP case, or with any one of the 8 LSB bits set to 1 for the extended CP case.

The present invention is explained again based on the aforementioned description. Since an interference measurement resource (CSI-IM resource configuration(S)), which is configured according to a channel state estimation process (CSI process), is restricted by a minimum period (i.e., 5 ms) of a CSI-RS configuration, it is difficult to efficiently disperse (distribute) the interference measurement resource on DL subframe sets (e.g., a static DL subframe set and a flexible DL subframe set) of which an interference characteristic is different from each other. In order to solve the problem, it may be able to configure a plurality of interference measurement resources (CSI-IM resource configuration(s)) on a single channel state estimation process (CSI process).

Specifically, it may be able to configure two interference measurement resources (CSI-IM resource configuration(s)) for a specific channel state estimation process (CSI process) and it may be able to configure each of the interference measurement resources to be interlocked with a static DL subframe set and a flexible DL subframe set, respectively. As an example, it may assume that each interference measurement resource (CSI-IM resource(s)) is valid on an interlocked DL subframe set only and a UE is able to perform an interference averaging operation on each DL subframe set using a valid interference measurement resource (CSI-IM resource(s)) only. Yet, as mentioned earlier with reference to an interference measurement resource (CSI-IM resource) and a zero-power CSI-RS resource, a legacy interference measurement resource (CSI-IM resource configuration(s)) has a limitation described in paragraph 7.2.6 of 3GPP TS 36.213 shown in Table 3 in the following.

TABLE 3

A UE is not expected to receive CSI-IM resource configuration(s) that are not all completely overlapping with one zero-power CSI-RS resource configuration which can be configured for the UE.
A UE is not expected to receive a CSI-IM resource configuration that is not completely overlapping with one of the zero-power CSI-RS resource configurations According to a first sentence of Table 3, CSI-IM configuration(s) has a limitation on being covered by a specific zero-power CSI-RS resource configuration (CSI-RS resource configuration) capable of being set to a UE. In other word, CSI-IM configuration(s) should be covered by a zero-power CSI-RS resource configuration of minimum period of 5 ms (or should be matched with 5 ms grid corresponding to a minimum period of a zero-power CSI-RS resource configuration). According to a second sentence of Table 3, CSI0IM resource configuration(s) set to a UE should be covered by a union of zero-power CSI-RS resource configuration(s) set to the UE.

Hence, it may be able to apply at least one selected from a method 1) to a method 4) in the present invention when a plurality of interference measurement resources configurations (CSI-IM resource configuration(s)) are set to a single channel state estimation process (CSI process). In the following, for clarity, assume a situation that two interference measurement resource configurations (CSI-IM resource configuration(s)) are configured for a specific channel state estimation process (CSI process) and each of the interference measurement resources (CSI-IM resource(s)) is respectively interlocked with a DL subframe set #A (i.e., a static DL subframe set) and a DL subframe set #B (i.e., a flexible DL subframe set) of which an interference characteristic is different from each other. It may be able to configure at least one of the methods to be applied (i.e., all of the proposed methods described in the following are to be applied at the same time or a partial combination of the methods is to be applied only).

Method 1: It is able to configure an interference measurement resource configuration (CSI-IM resource configuration) interlocked with a static DL subframe set (i.e., a DL subframe set #A) to follow the aforementioned legacy interference measurement resource configuration restriction of a wireless communication system.

Method 2: It is able to configure an interference measurement resource configuration (CSI-IM resource configuration) interlocked with a flexible DL subframe set (i.e., a DL subframe set #B) not to follow the aforementioned legacy interference measurement resource configuration restriction of a wireless communication system.

Method 3: It is able to configure an interference measurement resource configuration (CSI-IM resource configuration) interlocked with a static DL subframe set (i.e., a DL subframe set #A) positioned at a static DL subframe set to follow the aforementioned legacy interference measurement resource configuration restriction of a wireless communication system. In this case, as a different example, It is able to configure an interference measurement resource configuration (CSI-IM resource configuration) interlocked with a flexible DL subframe set (i.e., a DL subframe set #B) positioned at a flexible DL subframe set not to follow the aforementioned legacy interference measurement resource configuration restriction of a wireless communication system (or, it is able to configure an interference measurement resource configuration (CSI-IM resource configuration) interlocked with a flexible DL subframe set (i.e., a DL subframe set #B) positioned at a flexible DL subframe set to follow the aforementioned legacy interference measurement resource configuration restriction of a wireless communication system).

Method 4: It is able to configure an interference measurement resource configuration (CSI-IM resource configuration) interlocked with a flexible DL subframe set (i.e., a DL subframe set #B) positioned at a static DL subframe set not to follow the aforementioned legacy interference measurement resource configuration restriction of a wireless communication system. In this case, as a different example, It is able to configure an interference measurement resource configuration (CSI-IM resource configuration) interlocked with a static DL subframe set (i.e., a DL subframe set #A) positioned at a flexible DL subframe set not to follow the aforementioned legacy interference measurement resource configuration restriction of a wireless communication system (or, it is able to configure an interference measurement resource configuration (CSI-IM resource configuration) interlocked with a static DL subframe set (i.e., a DL subframe set #A) positioned at a flexible DL subframe set to follow the aforementioned legacy interference measurement resource configuration restriction of a wireless communication system). Moreover, as a further different example, it may be able to configure an interference measurement resource configuration (CSI-IM resource configuration) interlocked with a flexible DL subframe set (i.e., a DL subframe set #B) positioned at a static DL subframe set to exceptionally follow the aforementioned legacy interference measurement resource configuration restriction.

In particular, the interference measurement method according to the present invention can perform interference measurement based on an interference resource determined as valid according to at least one of the methods 1) to 4) which are configured according to one embodiment of the present invention.

Moreover, the aforementioned embodiments of the present invention can be configured to be restrictively applied only when an operation of dynamically changing a radio resource usage is configured.

Since the examples of the aforementioned proposed scheme of the present invention are able to be included as one of methods of implementing the present invention, it is apparent that the examples are capable of being regarded as a sort of proposed schemes. Each of the aforementioned proposed schemes can be independently implemented and can also be implemented in a manner of being combined (aggregated) with each other.

It may be able to configure the aforementioned embodiments of the present invention to be restrictively applied only when i) the predefined number of channel state estimation processes is configured and/or ii) restricted CSI measurement (or resource-specific CSI measurement) is configured and/or iii) a specific channel state information report type (e.g., periodic channel state information report, aperiodic channel state information report) is configured and/or iv) a specific transmission mode (TM) is configured and/or v) a specific UL-DL configuration is configured.

Figure 21:
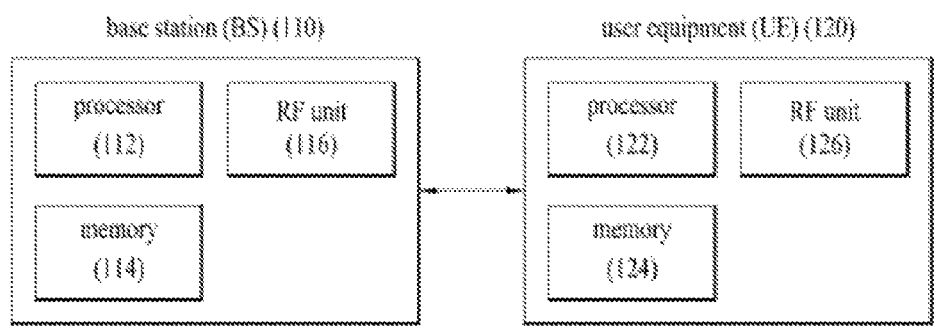
FIG. 21 is a diagram for examples of a base station and a user equipment capable of being applied to an embodiment of the present invention.

FIG. 21 is a diagram for a base station and a user equipment applicable to one embodiment of the present invention. If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 21, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the aforementioned method of configuring an interference measurement resource in a wireless communication system and an apparatus therefor are described centering on examples applied to 3GPP LTE system, it may be applicable to various kinds of wireless communication systems as well as to the 3GPP LTE system.

What is claimed is:

1. A method of measuring interference by a user equipment in a wireless communication system, the method comprising:
receiving a first interference measurement resource configuration for a first downlink subframe set and a second interference measurement resource configuration for a second downlink subframe set, being used to configure interference measurement resources for one channel state estimation process;
receiving a usage change message for changing a usage of a radio resource;
determining validity of each of the interference measurement resources as valid if each of the interference measurement resources exists in a transient period when the usage of the radio resource is changed from downlink to uplink by the usage change message, or if each of the interference measurement resources exists after the transient period when the usage of the radio resource is changed from uplink to downlink by the usage change message,
wherein the transient period is a period ranging from a timing of receiving the usage change message to a timing of changing the usage of the radio resource by the usage change message; and
measuring interference on one or more of the interference measurement resources if the one or more of the interference measurement resources are determined as valid,
wherein the first downlink subframe set is configured not to change the usage of the radio resource by the usage change message, and
wherein the second downlink subframe set is configured to change the usage of the radio resource by the usage change message.

2. The method of claim 1, wherein an interference characteristic of the first downlink subframe set and an interference characteristic of the second downlink subframe set are different from each other.

3. The method of claim 1, wherein when one or more of the interference measurement resources are positioned at the first downlink subframe set and are configured using the first interference measurement resource configuration, the validity of each of the interference measurement resources is determined based on a zero-power channel state information-reference signal (CSI-RS) resource configuration.

4. The method of claim 1, wherein when one or more of the interference measurement resources are positioned at the first downlink subframe set and are configured using the second interference measurement resource configuration, the validity of each of the interference measurement resources is determined irrespective of a zero-power channel state information-reference signal (CSI-RS) resource configuration.

5. The method of claim 1, wherein when one or more of the interference measurement resources are positioned at the second downlink subframe set and are configured using the first interference measurement resource configuration, the validity of each of the interference measurement resources is determined irrespective of a zero-power channel state information-reference signal (CSI-RS) resource configuration.

6. A user equipment for measuring interference in a wireless communication system, the user equipment comprising:
a radio frequency (RF) unit; and
a processor configured to:
control the RF unit to receive a first interference measurement resource configuration for a first downlink subframe set and a second interference measurement resource configuration for a second downlink subframe set, indicating interference measurement resources, being used to configure interference measurement resources for one channel state estimation process,
control the RF unit to receive a usage change message for changing a usage of a radio resource,
determine validity of each of the interference measurement resources as valid if each of the interference measurement resources exists in a transient period when the usage of the radio resource is changed from downlink to uplink by the usage change message, or if each of the interference measurement resources exists after the transient period when the usage of the radio resource is changed from uplink to downlink by the usage change message,
wherein the transient period is a period ranging from a timing of receiving the usage change message to a timing of changing the usage of the radio resource by the usage change message, and
measure interference on one or more of the interference measurement resources if the one or more of the interference measurement resources determined as valid,
wherein the first downlink subframe set is configured not to change the usage of the radio resource by the usage change message, and
wherein the second downlink subframe set is configured to change the usage of the radio resource by the usage change message.

7. The user equipment of claim 6, wherein an interference characteristic of the first downlink subframe set and an interference characteristic of the second downlink subframe set are different from each other.

8. The user equipment of claim 6, wherein when one or more of the interference measurement resources are positioned at the first downlink subframe set and are configured using the first interference measurement resource configuration, the validity of each of the interference measurement resources is determined based on a zero-power channel state information-reference signal (CSI-RS) resource configuration.

9. The user equipment of claim 6, wherein when one or more of the interference measurement resources are positioned at the first downlink subframe set and are configured using the second interference measurement resource configuration, the validity of each of the interference measurement resources is determined irrespective of a zero-power channel state information-reference signal (CSI-RS) resource configuration.

10. The user equipment of claim 6, wherein when one or more of the interference measurement resources are positioned at the second downlink subframe set and are configured using the first interference measurement resource configuration, the validity of each of the interference measurement resources is determined irrespective of a zero-power channel state information-reference signal (CSI-RS) resource configuration.

\* \* \* \* \*